(12) United States Patent
Thiel et al.

(10) Patent No.: US 8,290,240 B2
(45) Date of Patent: Oct. 16, 2012

(54) SYSTEM, APPARATUS, METHOD, AND COMPUTER PROGRAM PRODUCT FOR DETERMINING SPATIAL CHARACTERISTICS OF AN OBJECT USING A CAMERA AND A SEARCH PATTERN

(75) Inventors: Frank Thiel, Ober-Ramstadt (DE); Björn Popilka, Hemsbach (DE); Gerrit Kocherscheidt, Heddesheim (DE)

(73) Assignee: Sirona Dental Systems GmbH, Bensheim (DE)

(*) Notice: Subject to any disclaimer, the term of this patent is extended or adjusted under 35 U.S.C. 154(b) by 744 days.

(21) Appl. No.: 12/323,955

(22) Filed: Nov. 26, 2008

(65) Prior Publication Data

US 2009/0310869 A1 Dec. 17, 2009

Related U.S. Application Data

(63) Continuation-in-part of application No. 12/137,338, filed on Jun. 11, 2008, now Pat. No. 8,121,389.

(51) Int. Cl.
*G06K 9/00* (2006.01)
*G06K 9/68* (2006.01)

(52) U.S. Cl. .......... 382/141; 382/218; 348/86; 348/125; 700/95

(58) Field of Classification Search .................. 382/141, 382/218; 348/86, 125; 700/95
See application file for complete search history.

(56) References Cited

U.S. PATENT DOCUMENTS

| | | | |
|---|---|---|---|
| 4,145,803 A * | 3/1979 | Tasch, Jr. ...................... | 438/250 |
| 4,837,732 A | 6/1989 | Brandestini et al. | |
| 5,523,941 A | 6/1996 | Burton et al. | |
| 5,615,006 A * | 3/1997 | Hirukawa et al. ............. | 356/124 |
| 5,841,132 A * | 11/1998 | Horton et al. ............. | 250/231.13 |
| 5,852,675 A * | 12/1998 | Matsuo et al. ................ | 382/167 |

(Continued)

FOREIGN PATENT DOCUMENTS

EP 1701231 A1 * 9/2006

(Continued)

OTHER PUBLICATIONS

"Cercon Eye, The Scanning Module for Cercon Smart Ceramics", printed from http://www.plandent.com/pdf/downloads/Cercon_eye_Folder_GB.pdf, on or about Apr. 25, 2008 (6 sheets).

(Continued)

*Primary Examiner* — Aaron W Carter
(74) *Attorney, Agent, or Firm* — Fitzpatrick, Cella, Harper & Scinto

(57) ABSTRACT

A system, apparatus, method, and computer program product for evaluating an object disposed on an upper surface of an object holder. At least one first frame representing a captured portion of the object is acquired, while the object holder is positioned at each of multiple locations. At least one second frame representing a captured portion of at least one other surface of the object holder is acquired, while the object holder is positioned at each of the locations. At least one spatial characteristic associated with the captured portion of the object is determined based on at least one of the acquired frames. Values of multiple optical markers captured in each second frame are determined, where at least two of the optical markers have different characteristics. At least one of coordinates associated with the values and an orientation of the captured portion of the at least one other surface are determined.

3 Claims, 23 Drawing Sheets

U.S. PATENT DOCUMENTS

| | | | | |
|---|---|---|---|---|
| 6,412,183 | B1* | 7/2002 | Uno | 33/203.12 |
| 6,851,949 | B1 | 2/2005 | Sacdeva et al. | |
| 6,885,464 | B1 | 4/2005 | Pfeiffer et al. | |
| 7,335,876 | B2 | 2/2008 | Eiff et al. | |
| 7,336,375 | B1* | 2/2008 | Faul et al. | 356/604 |
| 7,456,842 | B2* | 11/2008 | Kosolapov | 345/589 |
| 7,853,352 | B2* | 12/2010 | Osterlund et al. | 700/194 |
| 2002/0015800 | A1* | 2/2002 | Miyamoto et al. | 427/553 |
| 2006/0067588 | A1* | 3/2006 | Makino et al. | 382/276 |
| 2006/0187432 | A1* | 8/2006 | Yasuda et al. | 355/53 |
| 2006/0204053 | A1* | 9/2006 | Mori et al. | 382/118 |
| 2007/0091174 | A1* | 4/2007 | Kochi et al. | 348/135 |
| 2008/0195343 | A1* | 8/2008 | Osterlund et al. | 702/95 |
| 2008/0225357 | A1* | 9/2008 | Ohara et al. | 358/498 |
| 2009/0088634 | A1* | 4/2009 | Zhao et al. | 600/427 |
| 2009/0310146 | A1 | 12/2009 | Pfeiffer et al. | |
| 2011/0013015 | A1* | 1/2011 | Park et al. | 348/125 |

FOREIGN PATENT DOCUMENTS

EP    2 136 334 A2    12/2009

OTHER PUBLICATIONS

"Budget Solution—Your Stepping Stone into CAD/CAM! inEos+ infiniDent", printed from http://www.inlab.com/ecomaXL/index.php?site=inEos_Main_Page, on or about Mar. 25, 2009 (2 sheets).

"Cercon Art 2.1 Instructions for Use—Cercon Smart Ceramics—The Zirconia All-porcelain System", DeguDent GmbH, pp. 12-16 (Sep. 2006).

N. Rego, "The Benefits of the New inLab InEos™ Add-on Scanner", Spectrum Reprint; 2005 (3 sheets).

U.S. Patent and Trademark Office, Office Action dated May 20, 2011, in connection with U.S. Appl. No. 12/137,338, 40 pages.

U.S. Patent and Trademark Office, Notice of Allowance and Fee(s) Due, dated Oct. 20, 2011, in connection with U.S. Appl. No. 12/137,338, 9 pages.

* cited by examiner

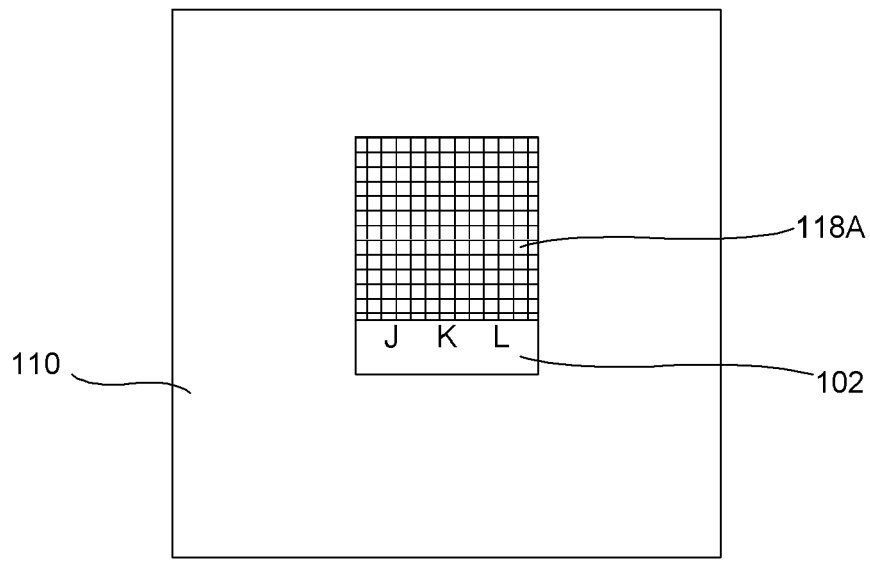
FIG. 3D
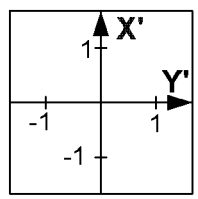
FIG. 3E
FIG. 3F
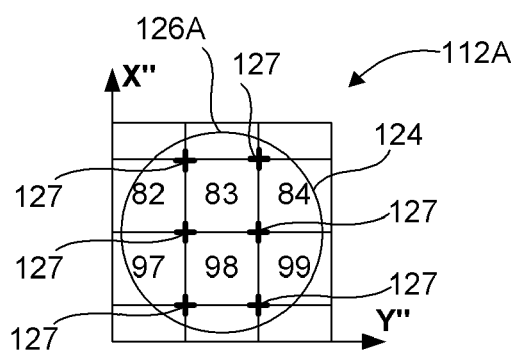
FIG. 3G
FIG. 3H

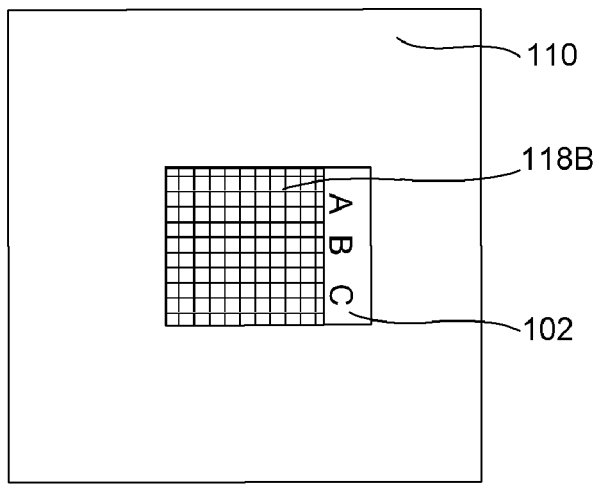
FIG. 3I
FIG. 3J
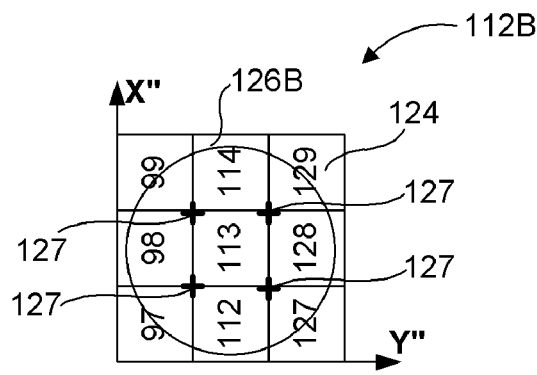
FIG. 3K
FIG. 3L
FIG. 3M

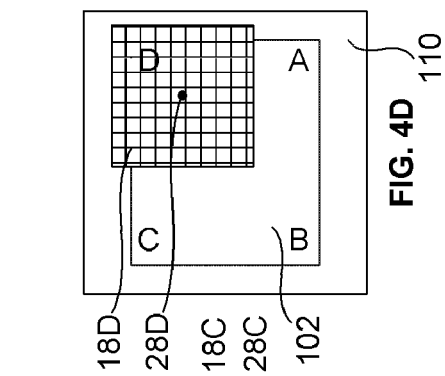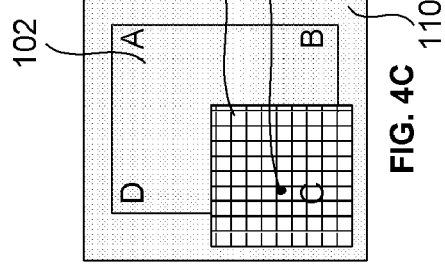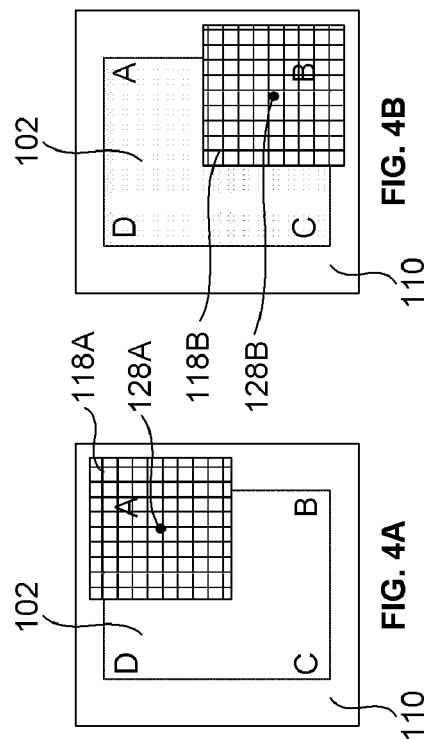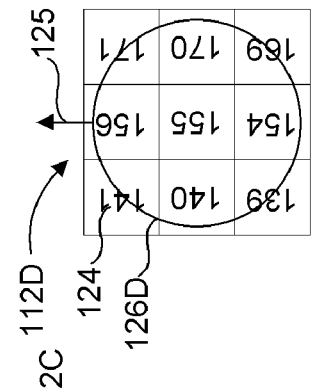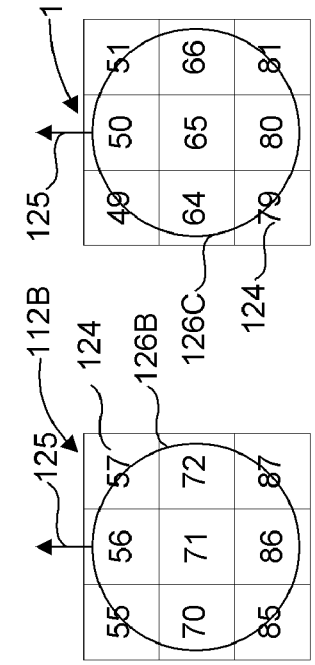

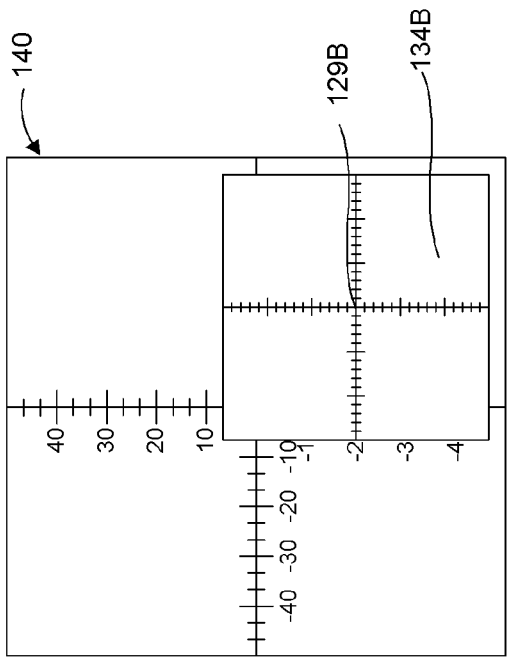
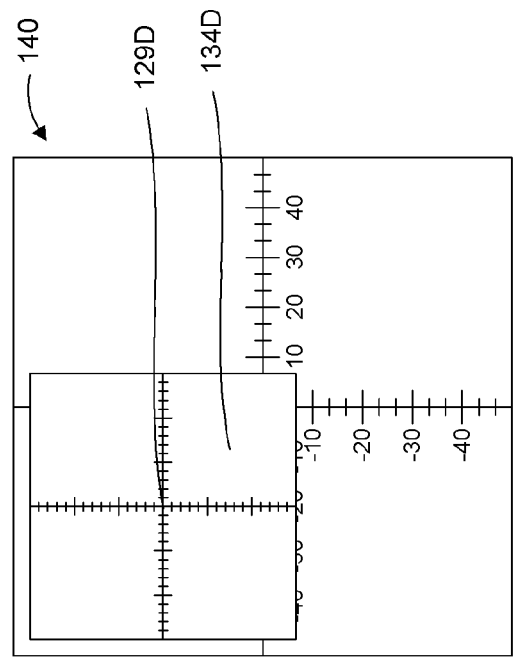
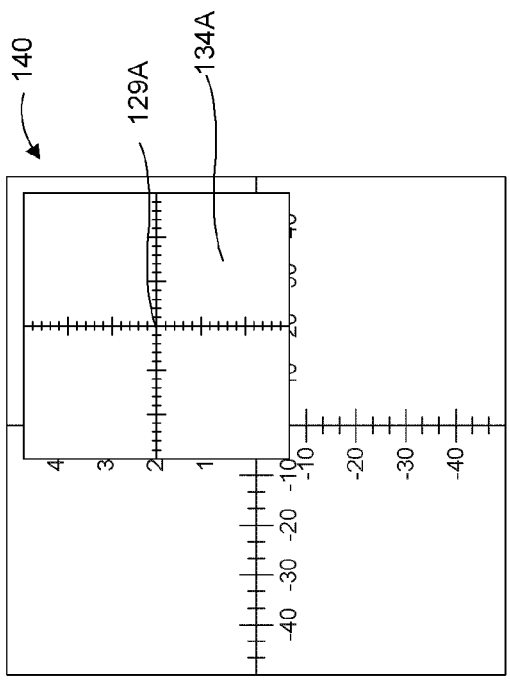
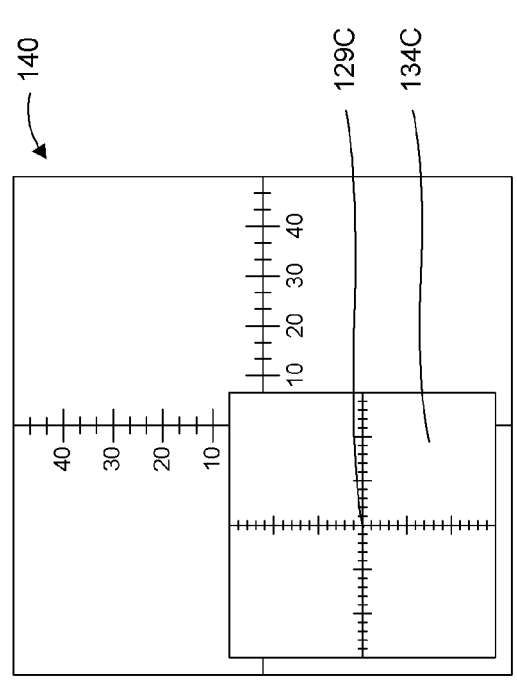
FIG. 8A
FIG. 8B
FIG. 8C
FIG. 8D

| 1500 |
| Optical Feature | Corresponding Feature Value |
| --- | --- |
| ● | 4 |
| ● | 3 |
| ● | 2 |
| ● | 1 |
| ● | 0 |
FIG. 15A
1505
| 1 | 0 | 1 | 0 | 0 |
|---|---|---|---|---|
| 3 | 0 | 0 | 3 | 0 |
| 0 | 0 | 0 | 2 | 0 |
| 0 | 1 | 4 | 0 | 0 |
| 0 | 0 | 3 | 0 | 0 |
FIG. 15B
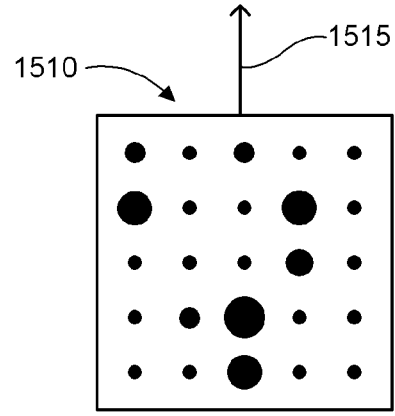
FIG. 15C
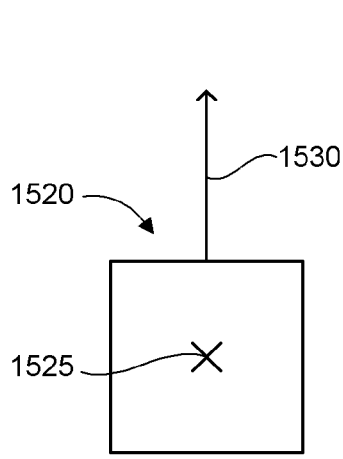
FIG. 15D
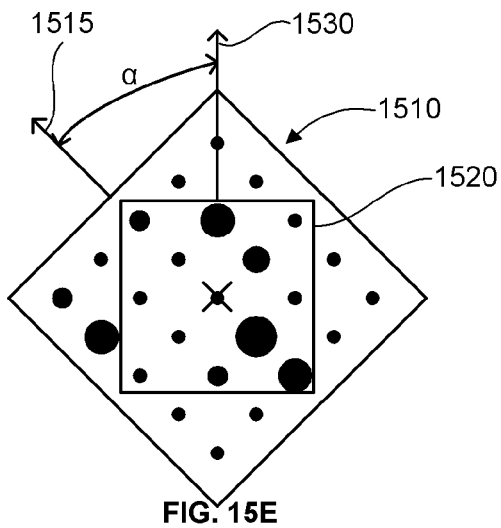
FIG. 15E
1535
| 0 | 0 | 3 |
|---|---|---|
| 0 | 0 | 2 |
| 1 | 4 | 0 |
FIG. 15F

FIG. 16A

| (66.25, 31.25) | (68.75, 31.25) | (71.25, 31.25) |
| --- | --- | --- |
| (66.25, 28.75) | (68.75, 28.75) | (71.25, 28.75) |
| (66.25, 26.25) | (68.75, 26.25) | (71.25, 26.25) |

FIG. 16B

SYSTEM, APPARATUS, METHOD, AND COMPUTER PROGRAM PRODUCT FOR DETERMINING SPATIAL CHARACTERISTICS OF AN OBJECT USING A CAMERA AND A SEARCH PATTERN

CROSS REFERENCE TO RELATED APPLICATION

This application is a continuation-in-part of U.S. patent application Ser. No. 12/137,338, filed Jun. 11, 2008, the contents of which are incorporated by reference herein in their entirety.

BACKGROUND OF THE INVENTION

1. Field of the Invention

The present invention generally relates to optical position recognition, and more particularly to methods, systems, apparatuses, and computer program products for employing optical position recognition techniques to correlate frame data acquired during multiple measurements (i.e., captured representations, such as, e.g. images or scans) of an object for use in obtaining a three-dimensional representation of the object.

2. Related Art

In conventional three-dimensional measurement systems, such as those having a small field of view used to obtain images of relatively larger objects, for example dental structures such as actual or prosthetic teeth or dental molds or castings, the measuring field or the measuring volume of the optical measurement system is smaller than a volume of the object to be measured. Accordingly, it is necessary to perform multiple measurements of different portions of the object to acquire substantially complete representations for the object. The object is moved relative to the optical measurement system between measurements. The data acquired from each measurement must be correlated, i.e., mapped onto a common coordinate system, to obtain a composite three-dimensional representation of the entire object.

Conventional three-dimensional measurement systems may employ mechanical registration techniques to correlate data acquired during multiple measurements. FIG. 10A depicts an exemplary system 1000 that uses conventional mechanical registration techniques to correlate three-dimensional data acquired during multiple measurements. The system 1000 includes measuring optics 1002 and a slide 1004. A support member 1006 positions the measuring optics 1002 at a fixed orientation relative to the slide 1004, such that there is no relative movement between the measuring optics 1002 and the slide 1004. A mechanical grid 1008 is provided on an upper surface of the slide 1004. An object 1010 is secured to an object holder 1012. The object holder 1012 is positioned in predetermined locations on the mechanical grid 1008. A measurement is performed and a frame of three-dimensional data is acquired at each location. A composite three-dimensional representation of the entire object is created by combining the frame data according to well-known frame registration techniques. A disadvantage of the system 1000 is that the object holder 1012 can be placed only in predetermined locations that are accommodated by the mechanical grid 1008, which may not be optimal locations for acquiring three-dimensional data.

Conventional three-dimensional measurement systems also may employ optical registration techniques to correlate frame data from multiple measurements. Positions are determined by points of reference located on an object holder. A Cercon Eye Scanner from DeguDent GmbH employs optical registration techniques, for example.

FIG. 10B depicts an exemplary system 1050 that uses conventional optical registration techniques to correlate three-dimensional data acquired during multiple measurements. The system 1050 includes measuring optics 1052 and a slide 1054. A support member 1056 positions the measuring optics 1052 at a fixed orientation relative to the slide 1054, such that there is no relative movement between the measuring optics 1052 and the slide 1054. An object 1058 is secured to an object holder 1060. The object holder 1060 includes a reference position marker adjuster 1061 that positions a reference position marker 1062 above the object 1058. The object holder 1060 is then moved over the slide 1054 in discrete steps. A measurement is performed and a frame of three-dimensional data is acquired during each step. Each measurement must include the reference position markers 1062. Optical registration techniques are used to identify the reference position marker 1062 and generate corresponding positioning information for each frame of three-dimensional data. A composite three-dimensional representation of the entire object is created by combining the frame data according to well-known frame registration techniques.

The measuring optics 1052 typically include a camera (not illustrated) that is employed to observe the reference position marker 1062 on the object holder 1060. A disadvantage of the system 1050 is that the camera must be able to view the reference position marker 1062 during each measurement. The reference position marker 1062 must not be covered by the object 1058 or otherwise obscured from the camera while measurements are taken.

Calibration patterns with circular structures have been used to calibrate measuring optics of photogrammetry systems, such as the systems shown in FIGS. 10A and 10B. These calibration patterns typically consist of unfilled circles having a constant radius, which are placed on a rectangular grid. Conventionally, a calibration pattern fits entirely within a field of view of the measuring optics to be calibrated. Because the entire calibration pattern is used to determine metrics of the measuring optics, it is not necessary to determine coordinates of a position on the calibration pattern based on a partial view of the calibration pattern.

The mentioned calibration patterns may be generated by offset printing on ceramic substrates. However, because offset printing may be reproducible on a scale of several 10 microns, the resulting calibration patterns are not sufficient for a calibration process. Each such calibration pattern can be calibrated by an independent measuring process, and a look-up table generated for every calibration pattern. Each look-up table contains exact positions of centers of every circle. Calibration of measuring optics using such a calibration pattern requires the full calibration pattern to be within the field of view of the measuring optics, if the look-up table is to be used. Accordingly, features of calibration patterns are not encoded for such applications.

Other methods may be used to generate such calibration patterns. For example, processes that are similar to semiconductor lithography processes for producing semiconductor devices, may be used to generate a calibration pattern. With these processes, a mask may be imaged onto a photo-resist resin disposed on top of a thin chrome layer located on a quartz substrate. The substrate is then illuminated and, in a subsequent etching step, regions that are not illuminated (i.e., masked) are removed. In other lithographic processes, a photo emulsion may be applied to a mylar foil, for example. Such lithographic processes results in small deviations of only a few microns over a total area of one square inch.

Accordingly, it is possible to generate highly accurate calibration patterns using such lithographic processes.

As mentioned above, when measuring optics are calibrated using conventional calibration processes, the measuring optics acquire an image of a complete calibration pattern. Thus, conventional calibration processes do not employ position recognition techniques to determine a position on the calibration pattern using acquired image data corresponding to a portion of the calibration pattern. However, position recognition techniques that use partial information of a search pattern are known. For example, position recognition techniques may be used in conjunction with a two-dimensional bar code encoded according to a Data Matrix standard (ISO/EC 16022—International Symbology Specification). A two-dimensional bar code is generated by encoding information with a high degree of redundancy. A partial image of the two-dimensional bar code may be acquired, and error correcting algorithms may be used to determine a position corresponding to the acquired image. Two-dimensional bar codes, however, are not optimized to allow initially unknown information to be extracted. That is, two-dimensional bar codes are not optimized for an absolute position to be determined when only partial bar code information is known.

The present invention overcomes the above limitations associated with measuring a three-dimensional object using conventional frame registration techniques.

BRIEF DESCRIPTION OF THE INVENTION

The present invention meets the above-identified needs by providing methods, systems, apparatuses, and computer program products for evaluating an object disposed on an upper surface of an object holder. Various embodiments of the present invention advantageously enable measurement data acquired during multiple measurements of an object to be correlated and combined to form composite measurement data of the object.

In accordance with one example aspect of the present invention, there is provided a method of evaluating an object disposed on an upper surface of an object holder. At least one first frame representing a captured portion of the object is acquired, while the object holder is positioned at each of a plurality of locations. At least one second frame representing a captured portion of at least one other surface of the object holder is acquired while the object holder is positioned at each of the plurality of locations. At least one spatial characteristic associated with the captured portion of the object is determined, based on at least one of the acquired frames. Values of a plurality of optical markers captured in each second frame are determined, where at least two of the optical markers have different characteristics. At least one of coordinates associated with the values and an orientation of the captured portion of the at least one other surface is determined.

The method also may include creating composite data based on the acquired frames, which may form a three-dimensional representation of the object. Further, the method may include, for each first frame, translating coordinates associated with the captured portion of the object, based on the orientation and the coordinates. The determining of the at least one of the coordinates and orientation may include: determining coordinates, in a first coordinate system, of a center portion of each optical marker included in the plurality of optical markers; generating a plurality of feature values, each associated with a center portion of a corresponding one of the plurality of optical markers; and obtaining coordinates, in a second coordinate system, associated with one or more of the plurality of feature values.

Each of the plurality of optical markers may have a circular shape, and each feature value may be a radius of a corresponding one of the plurality of circular optical markers. The plurality of optical markers may form an array. Data indicative of the at least one spatial characteristic may be stored or transmitted in a message. Each feature value may represent at least one of a color of a corresponding optical marker or a distance between at least two optical markers. The characteristics may include at least one of a size, a shape, and a color.

An apparatus, system, and computer program product that operate in accordance with the method also are provided, according to other example aspects of the invention.

In accordance with another example aspect of the present invention, there is provided a method of manufacturing an optical pattern. Coordinates, in a first coordinate system, of a plurality of predetermined locations on a substrate are determined. An array of feature values corresponding to the plurality of predetermined locations on the substrate is generated. A plurality of optical features is provided on the substrate at locations on the substrate associated with the feature values. The plurality of optical features may be provided on the substrate using a fine blanking process, a lithographic process, and/or a printing process.

In accordance with yet another example aspect of the present invention, there is provided a system for evaluating an optical coding pattern. An image acquiring unit is arranged to acquire at least one frame of image data corresponding to a captured portion of an optical coding pattern that includes an array of optical features, where the frame of image data includes a representation of the optical features. A processor is operable to correlate the array of optical features with an array of feature values corresponding thereto, and to determine at least one spatial characteristic associated with the captured portion of the optical coding pattern based on at least one of the feature values and the representation of the array of optical features.

The at least one spatial characteristic may include at least one of coordinates and an orientation of at least part of the optical coding pattern. The processor also may be operable to determine coordinates corresponding to a center portion of each optical feature. The system also may include an object holder, where the optical coding pattern is disposed in association with a lower surface of the object holder, and a measuring unit arranged to acquire at least one measurement frame of a captured portion of an object disposed on an upper surface of the object holder, where the processor is further operable to generate composite measurement data based on the at least one measurement frame acquired by the measurement unit and the at least one frame of image data acquired by the image acquiring unit.

BRIEF DESCRIPTION OF THE DRAWINGS

The features and advantages of the present invention will become more apparent from the detailed description set forth below when taken in conjunction with the drawings, in which like reference numbers indicate identical or functionally similar elements.

FIGS. 3A-3M illustrate a first example of multiple measurements of an object using the system illustrated in FIG. 1A.

FIGS. 4A-4D illustrate a second example of multiple measurements of an object using the system illustrated in FIG. 1A.

FIGS. 5A-5D illustrate respective views of the optical coding pattern shown in FIG. 1C, obtained by the camera of the system illustrated in FIG. 1A, during each of the measurements illustrated in FIGS. 4A-4D.

FIGS. 8A-8D illustrate translation of coordinates associated with the measurement data acquired during each of the measurements illustrated in FIGS. 4A-4D to the reference coordinate system illustrated in FIGS. 7A-6D.

FIG. 15A shows an exemplary table of optical features and corresponding feature values according to an embodiment of the present invention.

FIG. 15B illustrates a portion of the exemplary master array of feature values shown in FIG. 14.

FIG. 15C illustrates a portion of an exemplary optical coding pattern, which is encoded using the portion of the exemplary master array of feature values shown in FIG. 15B and the optical features shown in FIG. 15A.

FIG. 15D illustrates an exemplary camera view area according to an embodiment of the present invention.

FIG. 15E illustrates the portion of the optical coding pattern shown in FIG. 15C and the camera view area shown in FIG. 15D.

FIG. 15F illustrates an exemplary sub-array of feature values corresponding to the features that are within the camera view area shown in FIG. 15E.

FIG. 16A illustrates the sub-array of feature values shown in FIG. 15E located within the master array of feature values shown in FIG. 14.

FIG. 16B illustrates coordinates corresponding the sub-array of feature values located in the master array of features values shown in FIG. 16A.

DETAILED DESCRIPTION

I. Overview

Example embodiments of the present invention relate to methods, systems, apparatuses, and computer program products for employing optical position recognition techniques to correlate measurement data acquired during multiple measurements of surfaces of an object, to be used to obtain a composite representation of the object, even though a field of view of a measuring unit may be smaller than the size of the object. Each is useful for obtaining composite representations of any type of object, although the present application is described in the context of a dental apparatus that obtains composite three-dimensional representations of actual or prosthetic teeth or dental molds or castings.

II. System

The following description is described in terms of an exemplary system in which an exemplary embodiment of the present invention is implemented. This is for illustrative purposes only and is not intended to limit the scope of the application of the present invention to the described example only. It will be apparent to one skilled in the relevant art(s) in view of this description how to implement the present invention in alternative embodiments.

Figure 1A:
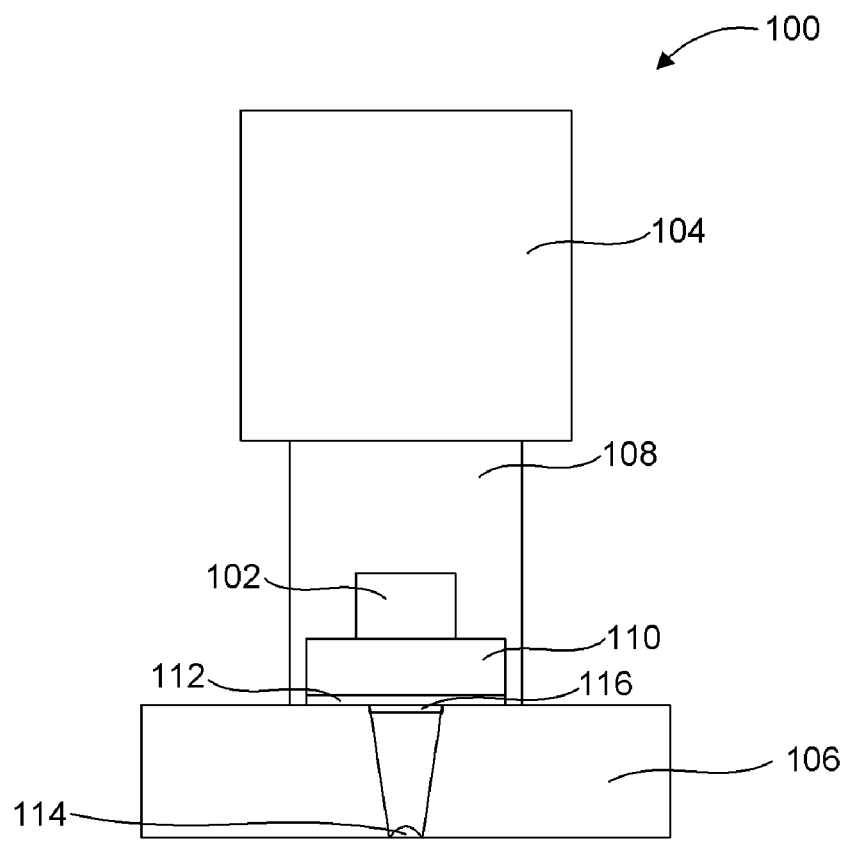
FIG. 1A illustrates a system according to an exemplary embodiment of the present invention.

FIG. 1A illustrates a system 100 according to an exemplary embodiment of the present invention. The system 100 enables images to be captured that can be used to form a three-dimensional representation of an object 102, such as a tooth or other object. The system 100 includes a measuring unit 104 and a slide 106. A support member 108 positions the measuring unit 104 at a fixed orientation relative to the slide 106, such that there is no relative movement between the measuring unit 104 and the slide 106.

The measuring unit 104 may be comprised of any suitable conventional or later developed three-dimensional measuring unit. For example, the measuring unit 104 may include a fringe-projection system, which consists of a fringe pattern projector and a camera. However, the measuring unit 104 that can be used with the present invention is not limited to a fringe-projection unit. Other types of three-dimensional measuring units may be used, e.g. the measuring unit 104 may employ confocal laser scanning microscopy, optical coherence tomography, white light interferometry, or other techniques known in the art. For example, col. 4, line 51, through col. 7, line 61, of U.S. Pat. No. 4,837,732 (Brandestini et al.) and col. 4, line 15, through col. 14, line 48, of U.S. Pat. No. 6,885,464 (Pfeiffer et al.) disclose systems suitable for use in the measuring unit 104. Those patents are incorporated by reference herein in their entireties, as fully set fourth herein.

The object 102 to be measured is placed on or secured to an object holder 110, which has an optical coding pattern 112 securely attached at a lower portion thereof Of course, the optical coding pattern 112 could be integrally formed with the lower portion of the object holder 110 without departing from the scope of the present invention. A camera unit 114 is disposed within the slide 106, or, in other embodiments, beneath the slide 106 so long as the optical coding pattern 112 is within the field of view of the camera unit 114. A transparent portion 116 is provided on an upper surface of the slide 106. The transparent portion 116 enables the camera unit 114 to view at least a portion of the optical coding pattern 112 to acquire image data representing that portion, which data is processed to determine spatial characteristics of the optical coding pattern 112, such as an orientation and a relative position of the optical coding pattern 112 with respect to the camera unit 114. Spatial characteristics of the optical coding pattern 112 are used to determine corresponding spatial characteristics of the object holder 110, such as an orientation and a relative position of the object holder 110 with respect to the measuring unit 104, as described below.

Figure 1B:
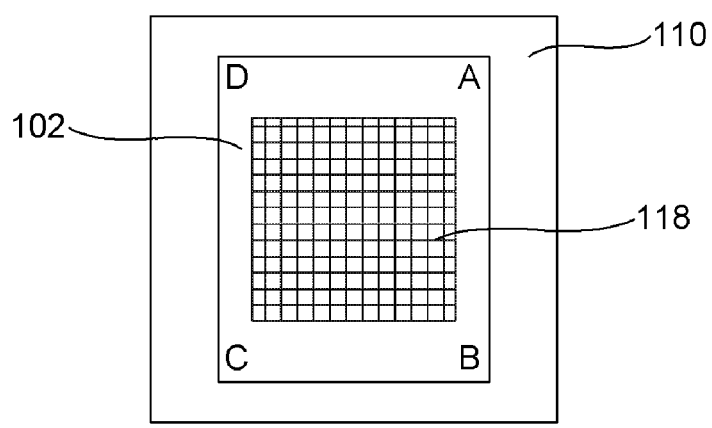
FIG. 1B illustrates a measurement area of the system illustrated in FIG. 1A.

FIG. 1B illustrates the object 102 and the object holder 110 depicted in FIG. 1A, as viewed from a perspective looking down on those components. The object 102 includes an upper-right portion A, a lower-right portion B, a lower-left portion C, and an upper-left portion D. The measuring unit 104 acquires measurement data in a measuring field 118 of the measuring unit 104. The terms "measuring field," "field of view," "measuring area," and "measuring volume" may be used interchangeably herein. Since the measuring field 118 can be smaller than the object 102, multiple measurements can be performed to acquire measurement data for the object 102, for use in obtaining a three-dimensional representation thereof, according to an aspect of the invention.

Figure 1C:
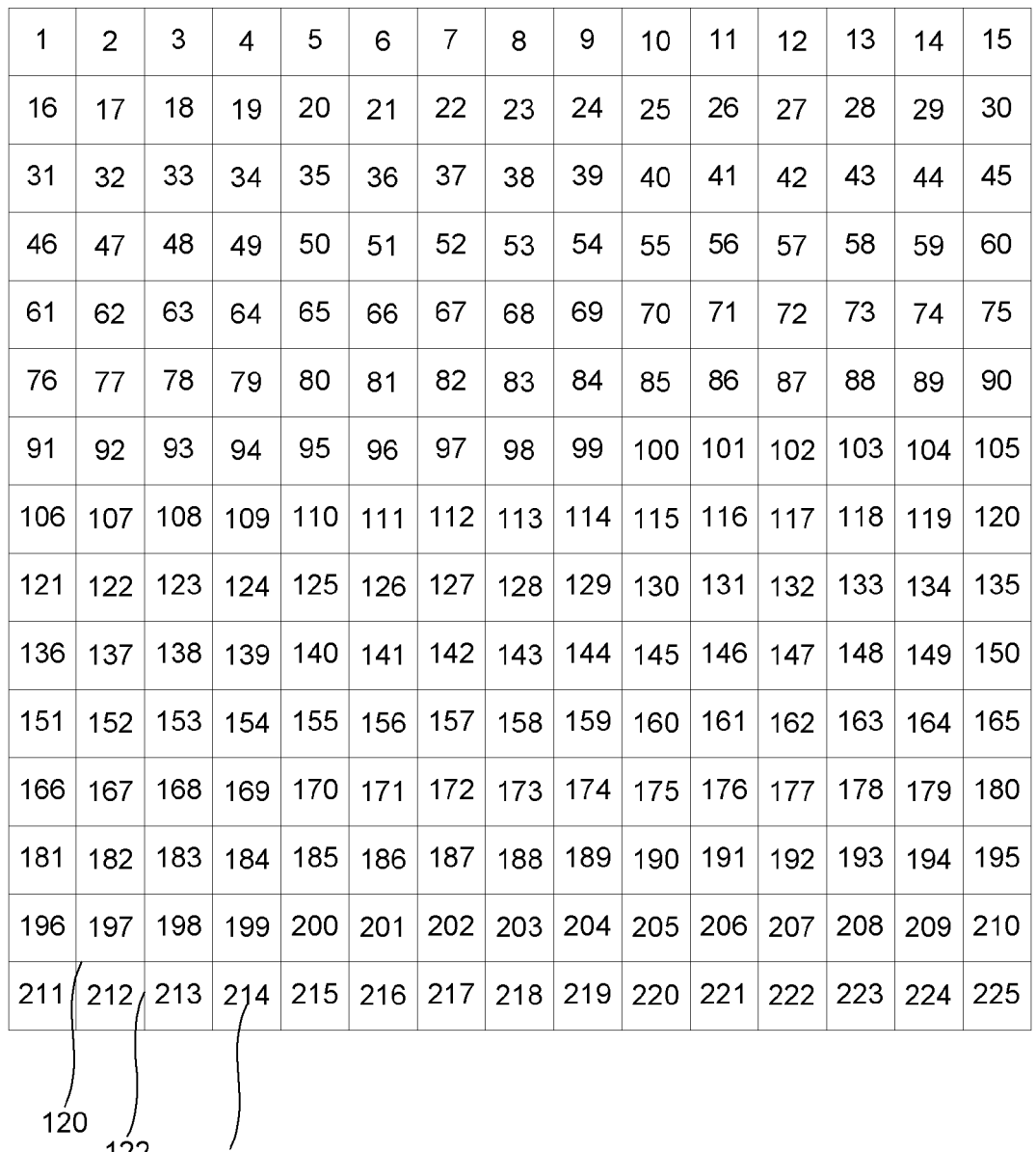
FIG. 1C illustrates an example of an optical coding pattern of the system illustrated in FIG. 1A.

FIG. 1C illustrates an exemplary optical coding pattern 112 of the present invention. The optical coding pattern 112 includes a plurality of horizontal line segments 120 and a plurality of vertical line segments 122, which form a grid pattern. The optical coding pattern 112 also includes a plurality of optical markers 124 that are used to identify predetermined locations on the optical coding pattern 112, such as the intersections of the horizontal line segments 120 and vertical line segments 122.

In the illustrated example, the optical markers 124 of the exemplary optical coding pattern 112 are numbers that range from 1-225, however, other types of optical markers 124 can be used. For example, the optical markers 124 may include a plurality of unique bar codes, and/or a plurality of circles each having a different radius. Other codes or symbols that uniquely identify a plurality of locations on the optical coding pattern 112 also may be used.

Figure 1D:
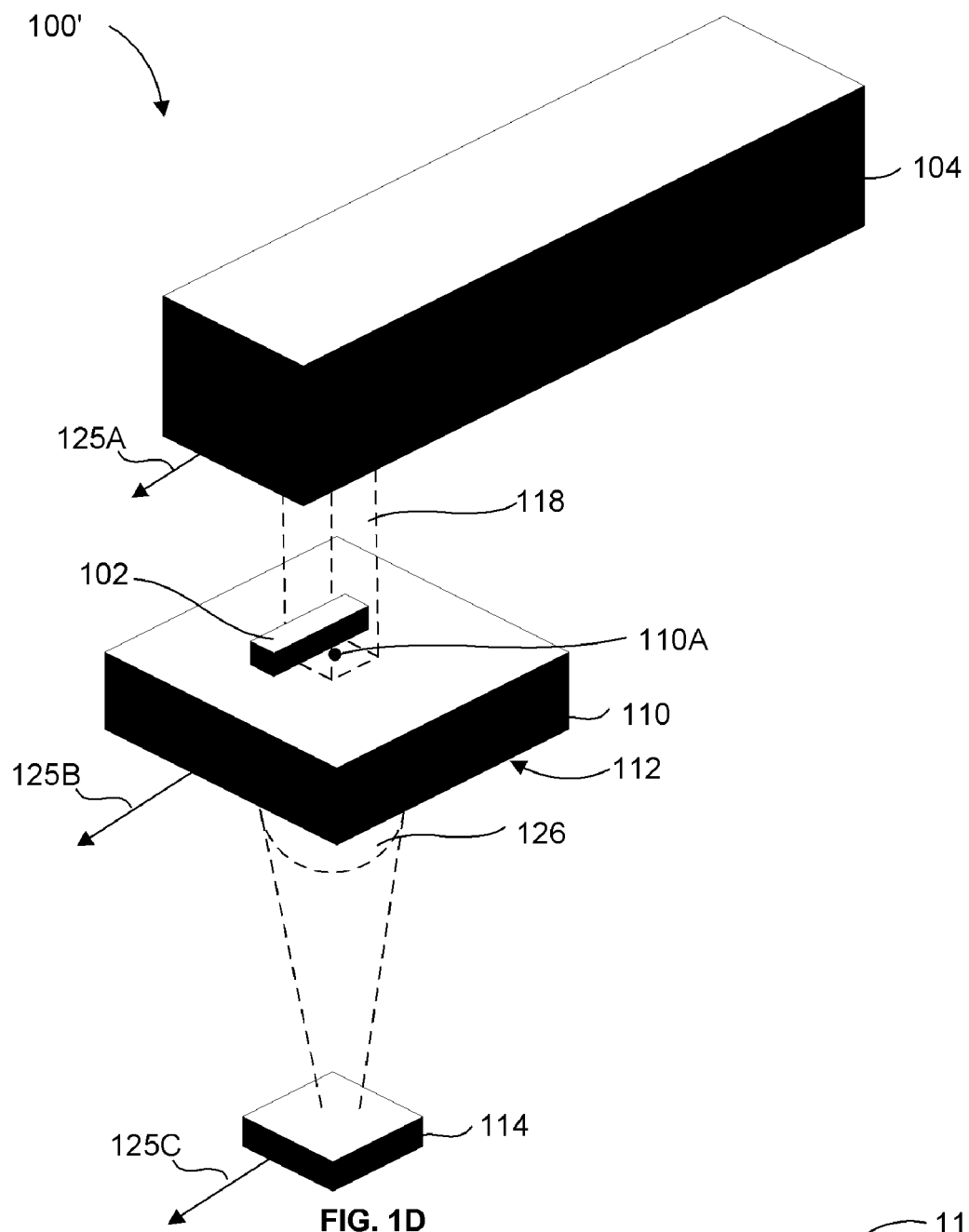
FIG. 1D is a perspective view of some components of the system illustrated in FIG. 1A.

FIG. 1D illustrates a portion 100' of the system 100 illustrated in FIG. 1A, such as measuring unit 104, object holder 110, optical coding pattern 112, camera unit 114, and measuring field 118. As represented in the example shown in FIG. 1D, the measuring unit 104 acquires measurement data of an object 102 in the measuring field 118 (within the field of view) of the measuring unit 104. The camera unit 114 acquires image data corresponding to an optical coding pattern 112, which is formed on a lower surface of the object holder 110. The camera unit 114 can be any camera that is capable of taking a two-dimensional image of the optical coding pattern 112. The camera unit 114 acquires image data corresponding to a view area 126.

Figure 1E:
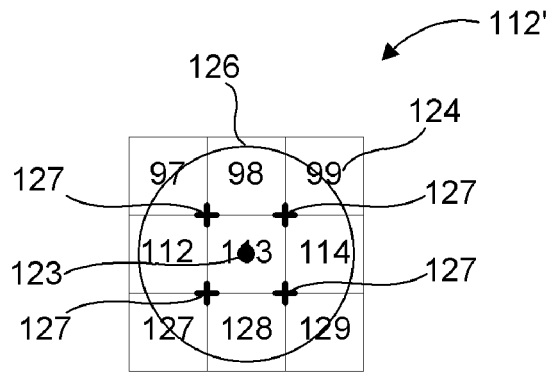
FIG. 1E illustrates a portion of the optical coding pattern illustrated in FIG. 1C and a view area of a camera unit of the system illustrated in FIG. 1D.

For illustrative purposes, the object holder 110 in the present example is deemed to be positioned such that a center of the measuring field 118 is aligned with a center of the object holder 110, which is aligned with a center of the view area 126 of the camera unit 114. The center of the object holder 110 is indicated by reference number 110A. In the present example, when the object holder is positioned as shown in FIG. 1D, a pixel 123 corresponding to the center of the view area 126 of the camera unit 114 is aligned with the center of the "113" optical marker of the optical coding pattern 112', as shown in FIG. 1E. The "113" optical markers 124 corresponds to a center optical marker 124 of the optical coding pattern 112, as shown in FIG. 1C.

In the example shown in FIG. 1D, the center of the measuring field 118 is aligned with the center pixel 123 of the view area 126 of the camera unit 114. In other embodiments, however, the center of the measuring field 118 may be offset from the center of the view area 126 of the camera unit 114 by a fixed amount, which is taken into account when translating coordinates (to be described below) representing a portion of the optical coding pattern 112 in a center of the view area 126 of the camera unit 114 to corresponding coordinates of a center of the measuring field 118 in a reference coordinate system of the object holder 110.

Also shown in FIG. 1D are arrows or axes labeled 125A, 125B, and 125C indicating reference orientations for coordinate systems of the measuring unit 104, the optical coding pattern 112, and the camera unit 114, respectively.

III. Process

Figure 2:
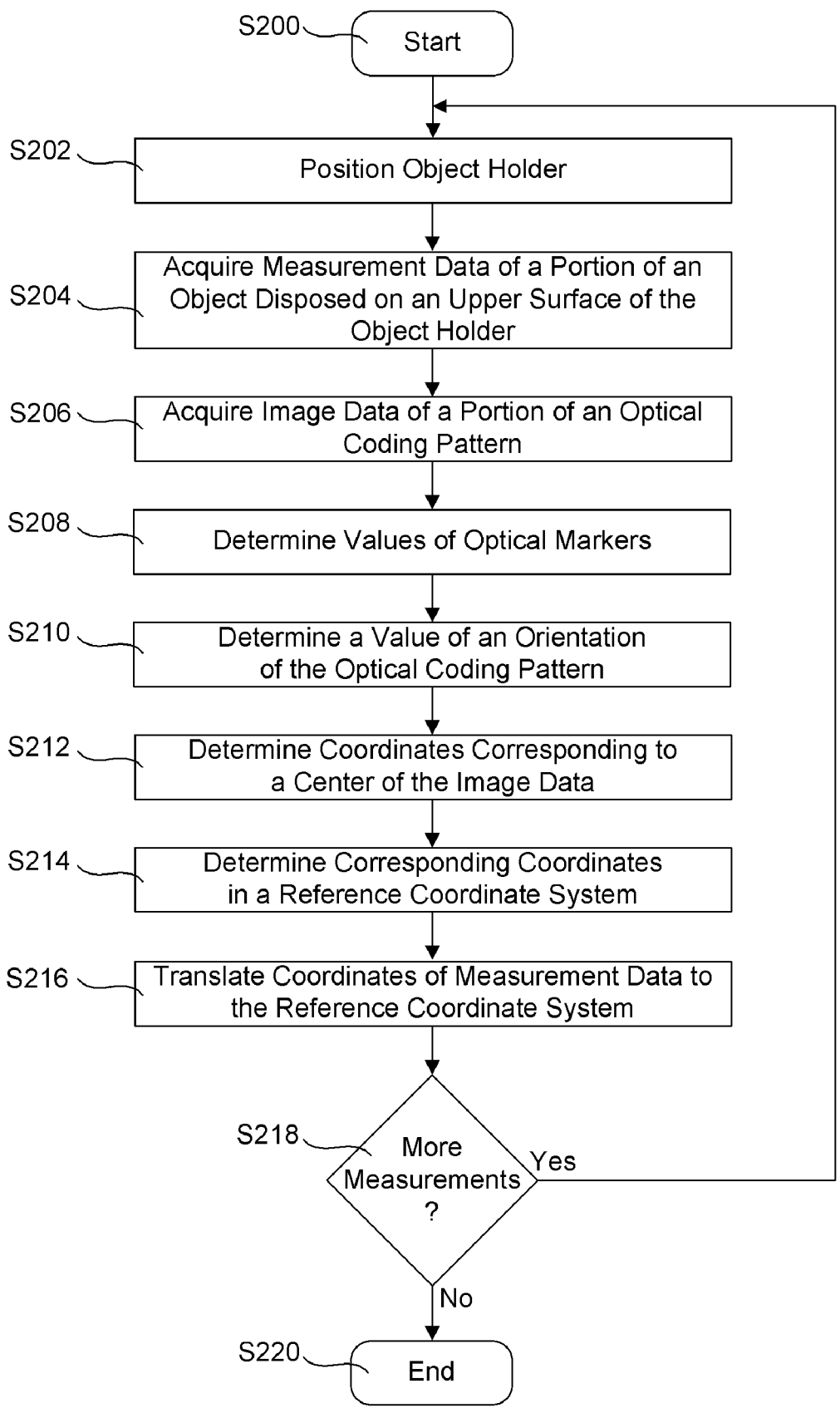
FIG. 2 illustrates an exemplary process for acquiring and correlating three-dimensional data using the system illustrated in FIG. 1A.
Figure 9:
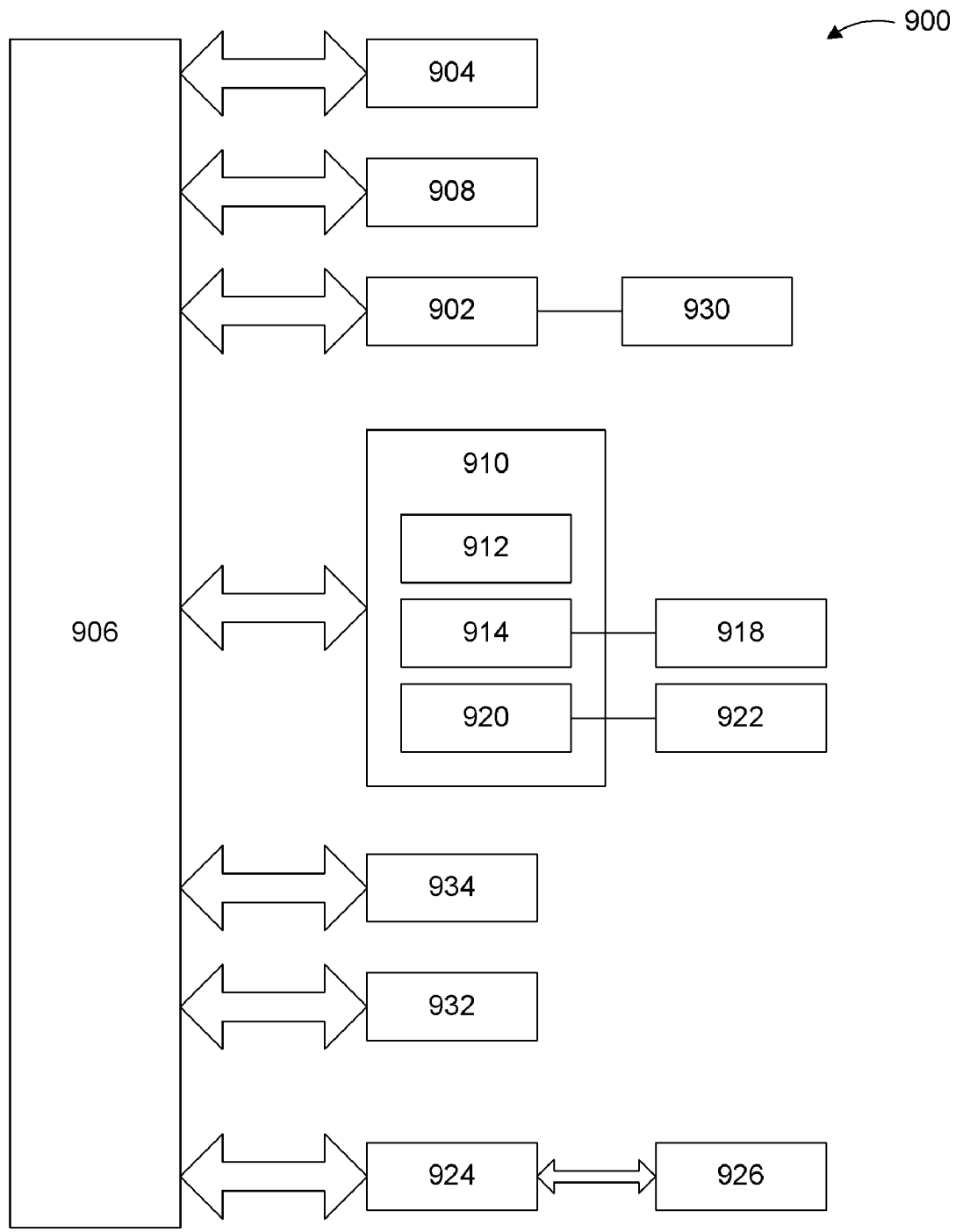
FIG. 9 illustrates a block diagram of a system architecture of a system according to an exemplary embodiment of the invention, that can be used in conjunction with the system illustrated in FIG. 1A.
Figure 10A:
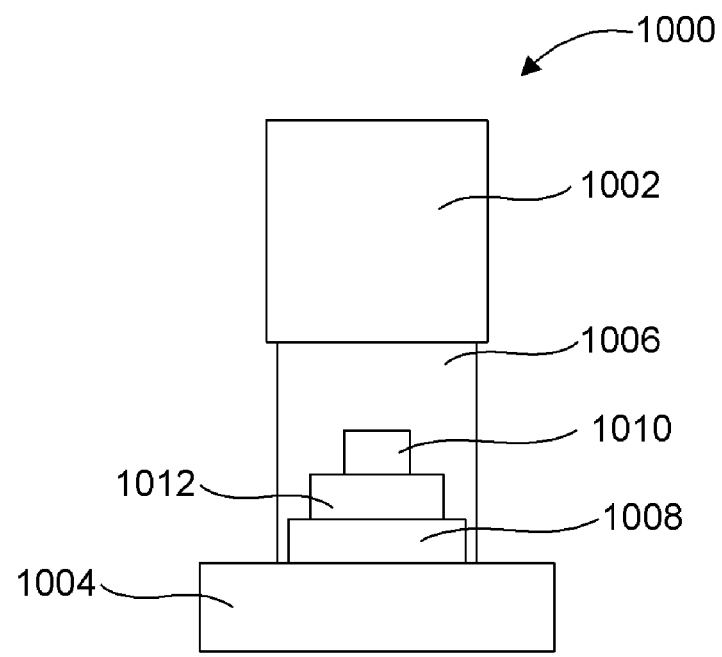
FIGS. 10A and 10B illustrate conventional three-dimensional measuring systems.
Figure 10B:
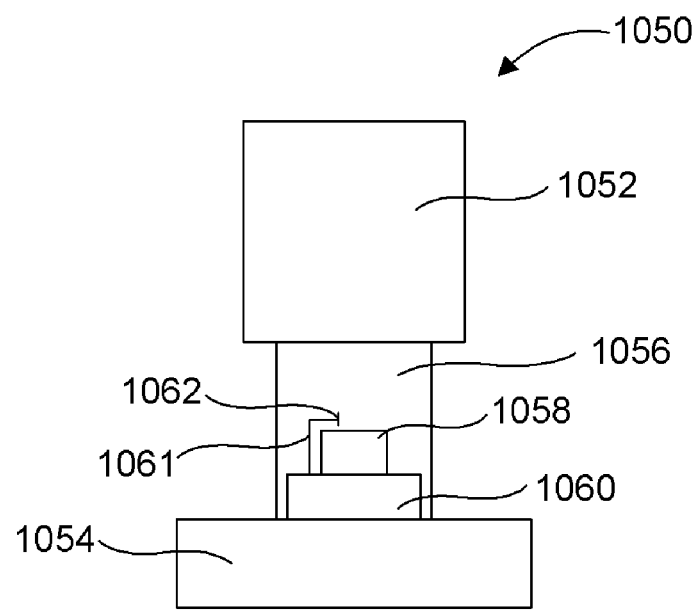

FIG. 2 illustrates an exemplary process, according to an aspect of the invention, for obtaining images of, and spatial characteristics (e.g. spatial coordinates and orientations) associated with, an object (e.g. one or more teeth), for use in obtaining a three-dimensional representation thereof The process can be performed by an optical position recognition system, such as the systems illustrated in FIGS. 1A and 9, for example. Referring to FIG. 2 in conjunction with FIGS. 1A through 1E, the process begins in Step S200. Initially, the object 102 is placed on or secured to an upper surface of the object holder 110.

In Step S202, the object holder 110 is positioned at a selected location on the slide 106. In Step S204, the measuring unit 104 acquires measurement data in the measuring field 118 in which a portion of the object 102 appears (i.e., the measuring unit 104 captures an image frame of that portion).

In Step S206, the camera unit 114 acquires image data of at least a portion of the optical coding pattern 112 in the field of view (view area) 126 of the camera unit 114 (i.e., the camera unit 114 obtains or captures a digitized scan or image frame of that portion of the optical coding pattern 112). That is, the camera unit 114 acquires image data corresponding to a portion of the optical coding pattern 112 that is disposed over and faces the transparent portion 116 of the slide 106. In a preferred embodiment, Step S204 and Step S206 occur simultaneously for each position of the object holder; although in other embodiments they need not be.

In Step S208, the processor of the system 100 uses a software module to process the image data obtained in Step S206 to determine values of one or more of the captured optical markers 124, which values are used in a manner to be described below (e.g. Step S212) to identify one or more intersections of line segments surrounding or adjacent to at least one of the captured optical markers 124. For example, in a case where the optical markers 124 are numbers, conventional optical character recognition (OCR) software may be used to determine a value of a captured optical marker 124. In a case where the optical markers 124 are barcodes, conventional bar code reading software may be used to determine a value of a captured optical marker 124. In a case where the optical markers 124 are circles each having a different radius, a software module may be used to determine values of a captured optical marker 124.

In Step S210, a processor (e.g., processor 906 of FIG. 9 to be described below) of the system 100 uses a software module to process the image data obtained in Step S206 to determine a value representing a spatial characteristic (i.e., an orientation) of the optical coding pattern 112 with respect to a reference orientation (e.g., 125B). In some embodiments, the software module is used to determine an orientation of one or more of the optical markers 124 to determine the orientation of the optical coding pattern 112.

For example, in a case where the optical markers 124 are circles each having a different radius, the software module may use the values of at least two captured optical markers 124 to determine the orientation of the optical coding pattern 112. This is because in some cases it can be more accurate to determine an orientation based on more than a single symmetrical marker, such as circle. In an example embodiment, the software module may make the determination based on an orientation of one or more line segments that intersect the centers of two identified circular optical markers 124.

Also, in some example embodiments, in Step S210 the software module is used to determine an orientation of one or more of the optical markers 124 and an orientation of one or more of the horizontal line segments 120 and/or the vertical line segments 122 to determine an orientation of the optical coding pattern 112 with respect to a reference orientation. The manner in which orientations are determined for one or more line segments, such as, e.g. segments 120 and/or 122, one or more optical markers 124, and the optical coding pattern 112, can be according to any suitable technique used to determine orientations of objects.

Location information representing coordinates of predetermined locations of each intersection of the horizontal line segments 120 and the vertical line segments 122 of the optical coding pattern 112 is stored in a memory unit (e.g. secondary memory 910 of FIG. 9 to be described below) of the system 100. The location information may be derived from calibration measurements or may be deduced from a specification for the optical coding pattern 112. In an example embodiment, the location information is stored in the memory unit prior to acquiring measurement data (e.g., Step S204) and is used to correlate measurement data acquired during multiple scans of an object.

In Step S212, the processor of the system 100 uses a software module to determine spatial characteristics such as coordinates that correspond to a center of the portion of the optical coding pattern 112 captured in the view area 126 of the camera unit 114. In one example embodiment, the software module makes this determination based on at least one of (a) particular intersections of the optical coding pattern 112 that are observed in the view area 126 of the camera unit 114, (b) location information associated with the observed intersections, (c) the values of the optical markers 124 determined in Step S208, and (d) the orientation of the optical coding pattern 112 determined in Step S210.

For example, in one case Step S212 can be performed by identifying one of the intersections surrounding or adjacent to an observed optical marker 124, retrieving coordinates (of the location information) corresponding to the identified intersection, and, based on these coordinates and the orientation of the optical coding pattern 112 obtained in Step S210, performing linear interpolation in a known manner to determine coordinates corresponding to a center of the portion of the optical coding pattern 112 captured in the view area 126 of the camera unit 114.

In Step S214, the processor of the system 100 uses a software module to translate coordinates associated with the center of the portion of the optical coding pattern 112 captured in the view area 126 of the camera unit 114 (as determined in Step S212) to corresponding coordinates of a center of the measuring field 118, in the coordinate system of the upper surface of the object holder 110.

Figure 6A:
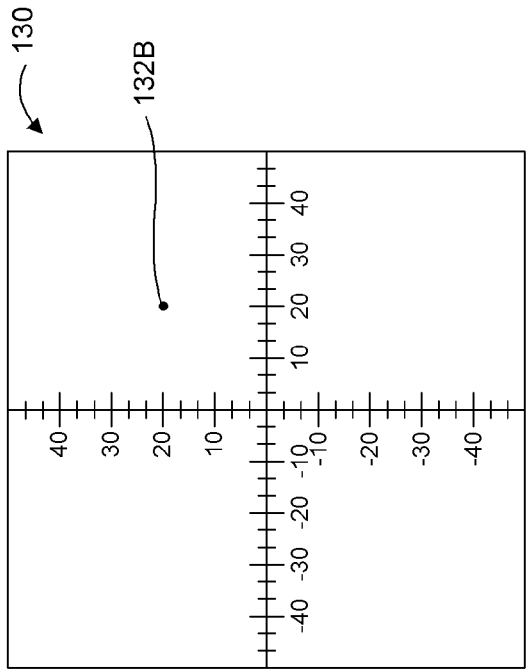
FIGS. 6A-6D illustrate coordinates in a coordinate system of the optical coding pattern illustrated in FIG. 1C, resulting from the measuring of the object illustrated in FIGS. 4A-4D.

As an example of a coordinate in one coordinate system converted to another system, FIG. 6A shows a coordinate of (20,−20) in a coordinate system 130 of the optical coding pattern 112, and 7A shows a coordinate of (20,20) converted into a reference coordinate system 140 of the upper surface of the object holder 110. The correspondence between coordinates in the coordinate system 130 of the optical coding pattern 112 and the reference coordinate system 140 of the upper surface of the object holder 110 depends on a predefined relationship between the two systems. Further, the correspondence between coordinates associated with the center of the portion of the optical coding pattern 112 captured in the view area 126 of the camera unit 114 and the coordinates of the center of the measuring field 118 of the measuring unit 104 depends on the physical arrangement of the measuring unit 104 with respect to the camera unit 114, and thus Step S214 can take into account that relationship as well.

In Step S216, the processor of the system 100 uses a software module to perform a translation of information obtained in Step S210 and a translation of spatial characteristics, such as coordinates associated with each datum of the measurement data acquired in Step S204, in a manner to be described below. Those coordinates may have been determined prior to Step S216, such as in Step S204, for example, or may be determined at the outset of Step S216. Those coordinates are in a coordinate system of the measuring unit 104.

Referring to Step S216, in that step the software module translates the orientation of the optical coding pattern 112 in the coordinate system of the optical coding pattern 112, determined in Step S210, to a corresponding orientation of the object holder 110 in the reference coordinate of the upper surface of the object holder 110. In other words, based on a predetermined mathematical algorithm defining a relationship between the two coordinate systems, the orientation in the coordinate system of the optical coding pattern 112 is "mapped" to a corresponding orientation in the reference coordinate system of the upper surface of the object holder 110. The software module then translates, using a mathematical transformation, coordinates associated with each datum of the measurement data acquired in Step S204 from the coordinate system of the measuring unit 104 to the reference coordinate system of the upper surface of the object holder 110. In this manner, despite where the object holder 110 is orientated when measurement data is taken, the acquired data may be placed in a reference orientation.

The translations performed in Steps S214 and S216 can be performed using any suitable translation algorithms operable according to this description, as would be readily appreciated by one skilled in the art in view of this description.

In Step S218, a determination is made whether more measurements are to be performed (e.g. whether additional measurements need to be performed to capture other desired parts of the object 102). If more measurements are to be performed ("Yes" at Step S218), Step S202 is repeated so that the object holder 110 is moved to another selected location on the slide 106, and Steps S204 through S218 are repeated for that location as described above. If no more measurements are to be performed ("No" at Step S218), the process ends in Step S220. All frames of measurement data have translated coordinates that are correlated in the reference coordinate system.

Accordingly, an aggregation of the frames of measurement data can be formed, using obtained spatial characteristics, such as coordinates, to provide composite measurement data for the object 102. As such, Step S220 can include combining the measurement data obtained in Step S204 based on the translated coordinates obtained in Step S216, to provide a composite three-dimensional representation of the captured parts of the object 102. This formation of the composite representation may be performed according to any suitable frame registration techniques, such as, e.g. an Iterative Closest Point (ICP) algorithm. However, in principle, no frame registration is needed, as the information from the camera unit 114 is sufficient to create a composite three-dimensional representation of the captured parts of the object 102.

IV. Exemplary Measuring Operations

First Example

Figure 3A:
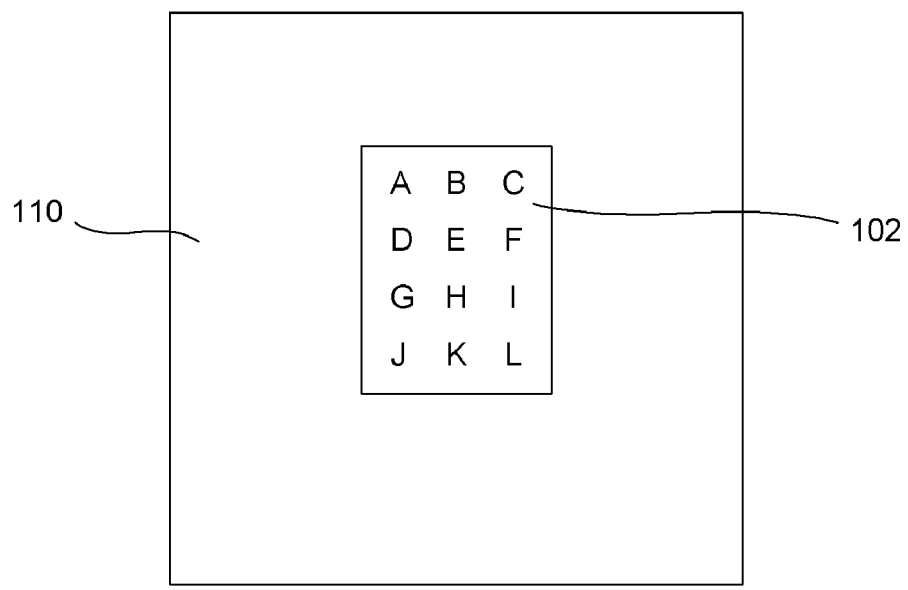

FIGS. 3A-3J illustrate a first example of how the system 100 of FIG. 1A correlates acquired measurement data (e.g. Steps S206 through S216 of FIG. 2) for the object 102 according to an exemplary embodiment of the present invention. Initially, the object 102 is secured to the object holder 110, for example, with an adhesive. As shown in FIG. 3A, the object 102 includes portions identified for illustrative purposes as portions A through L.

Figure 3B:
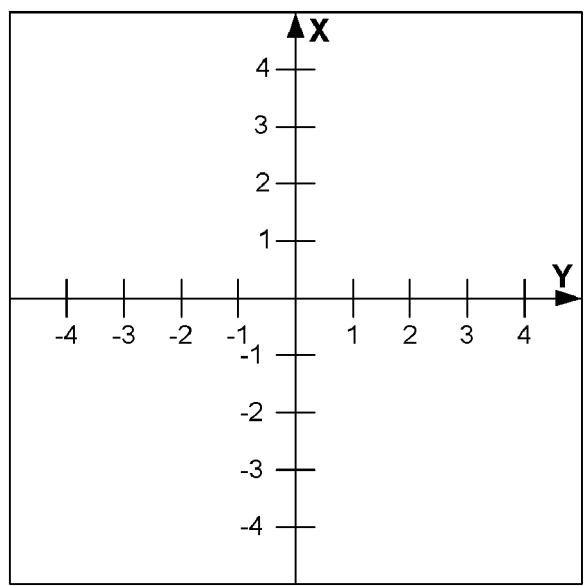
Figure 3C:
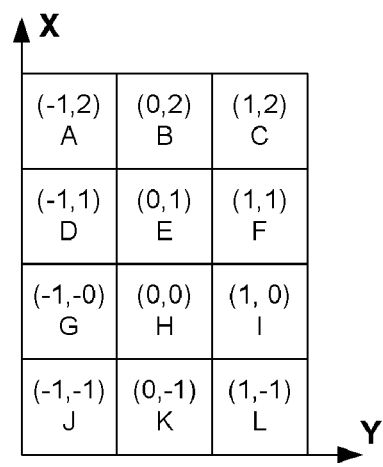

An exemplary object holder 110 has a square-shaped cross-sectional area, with each side of the square having a length of 10 centimeters (cm). A reference coordinate system (X, Y) of the upper surface of the object holder 110 has an origin corresponding to a center of the square, as shown in FIG. 3B. The coordinates of the reference coordinate system (X,Y) are spaced in 1 cm increments. Accordingly, each quadrant of the reference coordinate system (X,Y) is a 5 cm by 5 cm square, and coordinates within each quadrant range in magnitude between zero and 5 cm, as shown in FIG. 3B. FIG. 3C depicts a representation of portions A through L of the object 102 and associated coordinates in the reference coordinate system (X,Y).

First Example

Upper Portion

As shown in FIG. 3D, the object holder 110 is positioned so that the measuring unit 104 (not shown in FIG. 3D) acquires measurement data (e.g. Step S204 in FIG. 2) in a measuring field 118A that includes an upper portion of the object 102. FIG. 3E illustrates a coordinate system (X', Y') of the measuring unit 104 (not shown in FIG. 3E). The origin of the coordinate system (X', Y') of the measuring unit 104 corresponds to the center of the measuring field 118A. FIG. 3F depicts a representation of measurement data corresponding to portions A through I of the object 102, and associated coordinates in the coordinate system (X',Y') of the measuring unit 104.

FIG. 3G illustrates a portion 112A of the optical coding pattern 112 and a corresponding view area 126A of the camera unit 114 (not shown in FIG. 3G), when the object holder 110 is positioned as shown in FIG. 3D. As represented in FIG. 3G, the camera view area 126A is centered between the "83" and "98" optical markers 124 in a coordinate system (X", Y") of the optical coding pattern 112, when the object holder 110 is positioned as shown in FIG. 3D. This relationship can be appreciated further in view of FIGS. 1A, 1C, and 1D. The optical coding pattern 112 shown in FIG. 1C is positioned beneath the object holder 110 facing down towards the camera unit 114. In one example, the optical coding pattern 112 is oriented such that the upper-most row (including the values "1" to "15" among the optical marker 124 shown in FIG. 1C) is positioned away from the support member 108 and so that the lower-most row (including the values "211" to "225" among the optical markers 124 shown in FIG. 1C) is positioned closest to the support member 108.

As shown in FIG. 3G, the camera unit 114 (not shown) can envision, in the view area 126A, six intersections 127 of line segments and six optical markers 124 (e.g. Step S206 in FIG. 2). The processor uses a software module to determine at least one value of at least one of the optical markers 124 (e.g. Step S208 of FIG. 2). The processor also uses a software module to determine an orientation of at least one of the optical markers 124, which is used to determine an orientation of the optical coding pattern 112 (e.g. Step S210 of FIG. 2).

In addition, the processor uses a software module to retrieve coordinates associated with at least one of the intersections 127 of line segments from a memory unit (e.g. secondary memory 910 of FIG. 9 to be described below), which the processor uses to determine coordinates, in the coordinate system (X", Y") of the optical coding pattern 112, of a location of a portion 112A of the optical coding pattern 112 that corresponds to the center of the view area 126A (e.g. Step S212 of FIG. 2).

The processor employs a software module to transform the orientation of the optical coding pattern 112 determined in Step S210 into a corresponding orientation of the object holder 110 and to transform the coordinates of the center of the view area 126A (determined in Step S212) into corresponding coordinates of the center of the measuring field 118A, in the reference coordinate system (X, Y) of the upper surface of the object holder 110 (e.g. Step S214 of FIG. 2). In addition, the processor employs a software module to generate a transformation that is used to translate coordinates associated with the measurement data from the coordinate system (X', Y') of the measuring unit 104 to corresponding coordinates in the reference coordinate system (X, Y) of the upper surface of the object holder 110 (e.g. Step S216 of FIG. 2). FIG. 3H depicts a representation of the measurement data corresponding to portions A through I of the object 102 and associated coordinates, which have been translated to the reference coordinate system (X, Y) of the upper surface of the object holder 110.

First Example

Lower Portion

Next, as shown in FIG. 3I, the object holder 110 is positioned so that the measuring unit 104 (not shown in FIG. 3I) acquires measurement data (e.g. Step S204 in FIG. 2) in a measuring field 118B that includes a lower portion of the object 102. As shown in FIG. 3I, the object holder 110 has been rotated by ninety degrees from the orientation shown in FIG. 3D. A representation of measurement data corresponding to portions D through L of the object 102 and associated coordinates in the coordinate system (X',Y') of the measuring unit 104 are depicted in FIG. 3J.

FIG. 3K illustrates a portion 112B of the optical coding pattern 112 and a corresponding view area 126B of the camera unit 114 (not shown in FIG. 3K), when the object holder 110 is positioned as shown in FIG. 3I. The camera unit 114

(not shown in FIG. 3K) can envision, in the view area 126B, four intersections 127 of line segments and five optical markers 124 (e.g. Step S206 in FIG. 2). The processor uses a software module to determine values of at least one of the optical markers 124 (e.g. Step S208 of FIG. 2). The processor also uses a software module to determine an orientation of at least one of the optical markers 124 (e.g., the "13" optical marker 124), which is used as an orientation of the optical coding pattern 112 (e.g. Step S210 of FIG. 2).

In addition, the processor uses a software module to retrieve coordinates associated with at least one of the intersections 127 of line segments around the "13" optical marker 124 from a memory unit (e.g., secondary memory 910 of FIG. 9 to be described below), which the processor uses to determine coordinates associated with the center of the view area 126B, in the coordinate system (X",Y") of the optical coding pattern 112 (e.g. Step S212 of FIG. 2).

The processor employs a software module that uses the orientation of the optical coding pattern 112 determined in Step S210 and coordinates of the center of the view area 126A determined in Step S212 to determine a corresponding orientation of the object holder 110 and corresponding coordinates of the center of the measuring field 118B in the coordinate system (X,Y) of the upper surface of the object holder 110 (e.g. Step S214 of FIG. 2).

The processor employs a software module that uses the orientation of the object holder 110 and coordinates of the center of the measuring field 118B determined in Step S214 to generate a transformation that is used to translate coordinates associated with each datum of the measurement data acquired by the measuring unit 104 from the local coordinate system (X', Y') of the measuring unit 104 to corresponding coordinates in the reference coordinate system (X, Y) of the upper surface of the object holder 110 (e.g. Step S216 of FIG. 2).

FIG. 3L depicts a representation of the measurement data corresponding to portions D through L of the object 102 and associated coordinates, which have been translated from the coordinate system (X', Y') of the measuring unit 104 to the reference coordinate system (X, Y) of the upper surface of the object holder 110. As shown in FIG. 3L, the coordinates associated with portions D through L of the object 102 have been translated to account for the rotation of the optical coding pattern 112 shown in FIG. 3I.

Measurement data has been acquired for the upper and lower portions of the object 102. The processor uses a software module to combine the measurement data of the upper and lower portions of the object 102 to form composite measurement data for the object 102. FIG. 3M depicts a representation of composite measurement data corresponding to portions A through L of the object 102 and associated coordinates, which have been translated to the reference coordinate system (X, Y) of the upper surface of the object holder 110.

Second Example

FIGS. 4A-8E illustrate a second example of how the system 100 of FIG. 1A correlates acquired three-dimensional data (e.g. Steps S206 through S216 of FIG. 2) for an object 102 according to an exemplary embodiment of the present invention. Initially, the object 102 is secured to the object holder 110, for example, with an adhesive.

An exemplary object holder 110 has a square-shaped cross-sectional area, with each side of the square having a length of 10 cm. A reference coordinate system 140 has an origin corresponding to a center of the square. The coordinates of the reference coordinate system are spaced in 1 millimeter (mm) increments. Accordingly, each quadrant of the reference coordinate system is a 5 cm by 5 cm square, and coordinates within each quadrant range in magnitude between zero and 50 mm (5 cm), as shown in FIGS. 7A-7D.

Second Example

Upper-Right Portion A

The object holder 110 is positioned so that the measuring unit 104 acquires measurement data in a measuring field 118A that includes the upper-right portion A of the object 102, as shown in FIG. 4A. FIG. 5A illustrates a portion 112A of the optical coding pattern 112 and a corresponding view area 126A of the camera unit 114, when the object holder 110 is positioned as shown in FIG. 4A.

The processor of the system 100 uses a software module to process image data acquired by the camera unit 114, corresponding to a camera view area 126A (FIG. 5A), to determine at least one value of at least one of the optical markers 124 in the camera view area 126A, as described above with respect to Step S208. The processor uses the value(s) of the optical markers 124 in the camera view area 126A to identify an intersection in the vicinity of the optical markers 124. The processor retrieves coordinates associated with the intersection and determines a location (indicated by reference numeral 132A in FIG. 6A) and associated coordinates that correspond to a center of the view area or of the taken image 126A, as described above with respect to Step S212.

In addition, the processor of the system 100 uses a software module to process the image data acquired by the camera unit 114 to determine an orientation of at least one of the captured optical markers 124 with respect to the reference orientation indicated by arrow 125 in FIG. 5A (e.g. Step S210 of FIG. 2). In the illustrated example, the orientation of the optical markers 124 shown in FIG. 5A with respect to the reference orientation indicated by arrow 125 is zero degrees, since the optical markers 124 are not rotationally offset from the arrow 125.

Figure 7A:
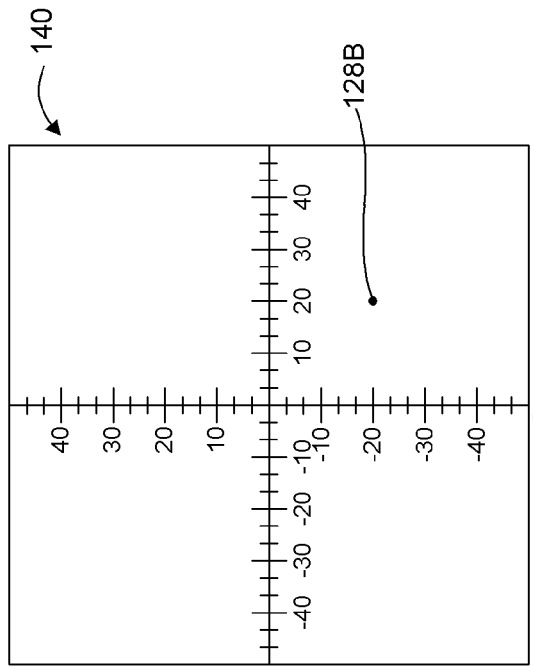
FIGS. 7A-7D illustrate translation of coordinates from the coordinate system illustrated in FIGS. 6A-6D to a reference coordinate system.

FIG. 6A illustrates a representation of a coordinate system 130 of the optical coding pattern 112. In this example, the coordinates of the location indicated by reference numeral 132A in FIG. 6A represent the center of the camera view area 126A, and are determined to be (20, −20). The processor uses a software module to translate the coordinates of the location indicated by reference numeral 132A to a corresponding location in a reference coordinate system 140 of the upper surface of the object holder 110, which is represented by reference numeral 128A in FIG. 7A (e.g. Step S214). Coordinates associated with the location indicated by reference numeral 128A are determined to be (20, 20), as shown in FIG. 7A.

The processor translates coordinates associated with each datum of the measurement data 134A (FIG. 8A), which was acquired in the measuring field 118A of FIG. 4A, to corresponding coordinates in the reference coordinate system 140 of the upper surface of the object holder 110 (e.g. Step S216). For example, coordinates associated with the center of the three-dimensional data 134A, which is indicated by reference number 129A in FIG. 8A, are translated to correspond with the coordinates of the location of the center of the measuring field 118A indicated by reference numeral 128A in FIG. 7A.

Second Example

Lower-Right Portion B

Next, the object holder 110 is positioned so that the measuring unit 104 acquires measurement data in a measuring field 118B that includes the lower-right portion B of the object 102, as shown in FIG. 4B. FIG. 5B illustrates a portion 112B of the optical coding pattern 112 and a corresponding camera view area 126B of the camera unit 114, when the object holder is positioned as shown in FIG. 4B.

The processor of the system 100 uses a software module to process image data acquired by the camera unit 114, corresponding to a camera view area 126B (FIG. 5B), to determine at least one value of at least one of the optical markers 124 in the camera view area 126B, as described above with respect to Step S208. The processor uses the value(s) of the optical markers 124 in the camera view area 126B to determine a location (indicated by reference numeral 132B in FIG. 6B) and associated coordinates that correspond to a center of the camera view area 126B, as described above with respect to Step S212.

In addition, the processor of the system 100 uses a software module to process the image data acquired by the camera unit 114 to determine an orientation of the optical markers 124 with respect to the reference orientation indicated by arrow 125 in FIG. 5B (e.g. Step S210 of FIG. 2). In the illustrated example, the orientation of the optical markers 124 shown in FIG. 5B with respect to the reference orientation indicated by arrow 125 is zero degrees, since the optical markers 124 are aligned with the reference orientation indicated by arrow 125 in FIG. 5B.

Figure 6B:
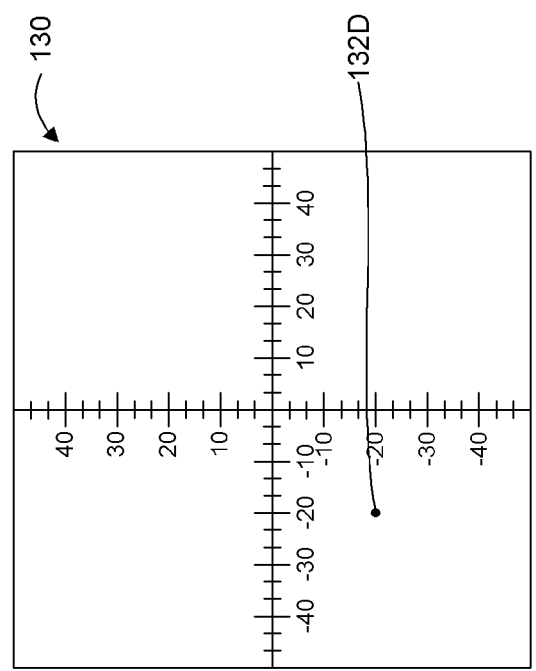
Figure 7B:
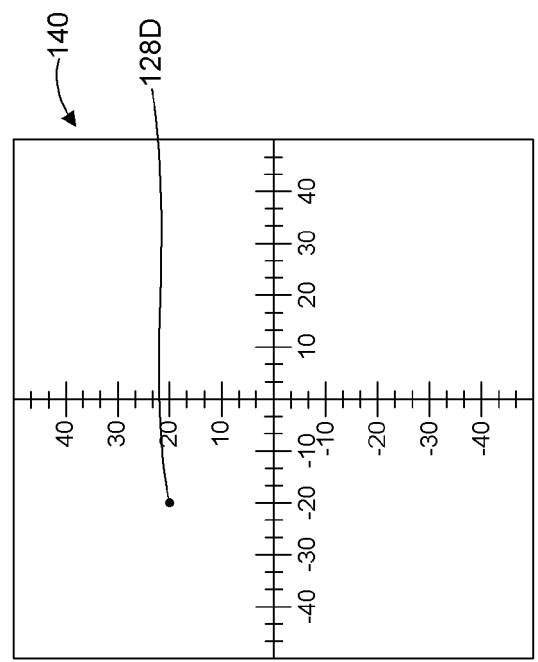

FIG. 6B illustrates a representation of the coordinate system 130 of the optical coding pattern 112. In this example, the center of the camera view area 126B is indicated by reference numeral 132B in FIG. 6B and has coordinates that are determined to be (20, 20). The processor translates the coordinates associated with the center of the camera view area 126B to a corresponding location in the reference coordinate system 140 of the upper surface of the object holder 110. The corresponding location indicated by reference numeral 128B has coordinates that are determined to be (20, −20), as shown in FIG. 7B.

The processor uses a software module to translate coordinates associated with the three-dimensional data 134B (FIG. 8B), which was acquired in the measuring field 118B of FIG. 4B, to corresponding coordinates in the reference coordinate system 140 of the upper surface of the object holder 110 (e.g. Step S216). For example, coordinates associated with the center of the three-dimensional data 134B, which is indicated by reference number 129B in FIG. 8B, are translated to correspond with the coordinates of the location of the center of the measuring field 118B indicated by reference numeral 128B in FIG. 7B.

Second Example

Lower-Right Portion C

Next, the object holder 110 is positioned so that the measuring unit 104 acquires measurement data in a measuring field 118C that includes the lower-left portion C of the object 102, as shown in FIG. 4C. FIG. 5C illustrates a portion 112C of the optical coding pattern 112 and a camera view area 126C of the camera unit 114, when the object holder is positioned as shown in FIG. 4C.

The processor of the system 100 uses a software module to process image data acquired by the camera unit 114, corresponding to a camera view area 126C, to determine at least one value of at least one of the optical markers 124 in the camera view area 126C, as described above with respect to Step S208. The processor uses the value(s) of the optical markers 124 in the camera view area 126C to determine coordinates (indicated by reference numeral 132C in FIG. 6C) that correspond to a center of the camera view area 126C, as described above with respect to Step S212.

In addition, the processor of the system 100 uses a software module to process the image data acquired by the camera unit 114 to determine an orientation of the optical markers 124 with respect to the reference orientation indicated by arrow 125 in FIG. 5C. In the illustrated example, the orientation of the optical markers 124 shown in FIG. 5C with respect to the reference orientation indicated by arrow 125 is zero degrees, since the optical markers 124 are aligned with the reference orientation indicated by arrow 125 in FIG. 5C.

Figure 6C:
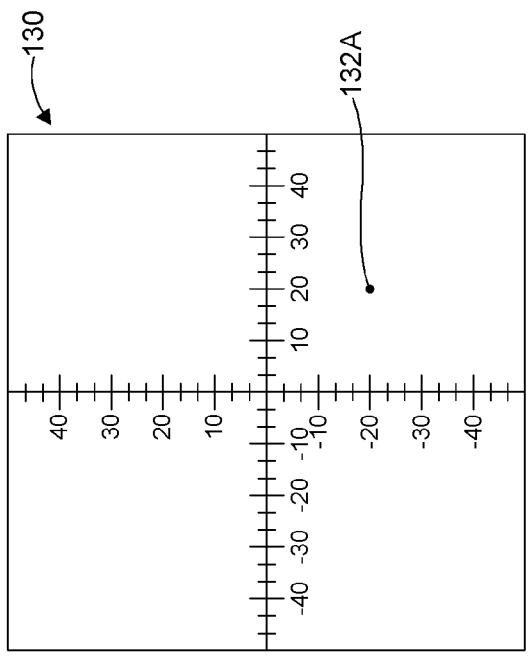
Figure 7C:
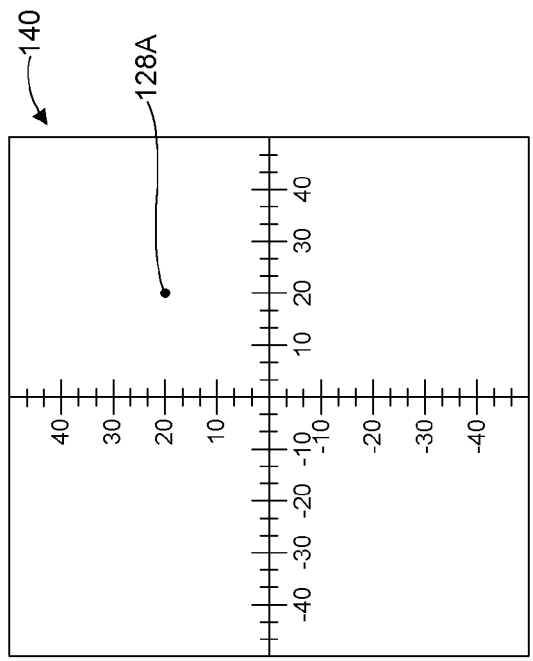

FIG. 6C illustrates a representation of the coordinate system 130 of the optical coding pattern 112. In this example, the center of the camera view area 126C is indicated by reference numeral 132C in FIG. 6C and has coordinates that are determined to be (−20, 20). The processor translates the coordinates associated with the center of the camera view area 126C to a corresponding location in the reference coordinate system 140 of the upper surface of the object holder 110. The corresponding location indicated by reference numeral 128C has coordinates that are determined to be (−20, −20), as shown in FIG. 7C.

The processor uses a software module to translate coordinates associated with three-dimensional data 134C (FIG. 8C), which was acquired in the measuring field 118C of FIG. 4C, to corresponding coordinates in the reference coordinate system 140 of the upper surface of the object holder 110 (e.g. Step S216). For example, coordinates associated with the center of the three-dimensional data 134C, which is indicated by reference number 129C in FIG. 8C, are translated to correspond with the coordinates of the location of the center of the measuring field 118C indicated by reference numeral 128C in FIG. 7C.

Second Example

Upper-Left Portion D

Next, the object holder 110 is positioned so that the measuring unit 104 acquires measurement data in a measuring field 118D that includes the upper-left portion D of the object 102, as shown in FIG. 4D. For illustrative purposes, the object holder 110 is rotated by ninety degrees from the orientation shown in FIG. 4C. FIG. 5D illustrates a portion 112D of the optical coding pattern 112 and a camera view area 126D of the camera unit 114, when the object holder is positioned as shown in FIG. 4D.

The processor of the system 100 uses a software module to process image data acquired by the camera unit 114, corresponding to the camera view area 126D, to determine at least one value of at least one of the optical markers 124 in the camera view area 126D, as described above with respect to Step S208. The processor uses the value(s) of the optical markers 124 in the camera view area 126D to determine coordinates (indicated by reference numeral 132D in FIG. 6D) that correspond to a center of the camera view area 126D, as described above with respect to Step S212.

In addition, the processor of the system 100 uses a software module to process the image data acquired by the camera unit 114 to determine an orientation of the optical markers 124 with respect to the reference orientation indicated by arrow 125 in FIG. 5D. In this example, the orientation of the optical markers 124 shown in FIG. 5D with respect to the reference orientation in the coordinate system 130 of the optical coding pattern 112 is two-hundred-seventy degrees in a clockwise direction (ninety degrees in a counter-clockwise direction), as a result of rotating the object holder 110 by ninety degrees in a clockwise direction with respect to the reference orientation in the reference coordinate system 140.

Figure 6D:
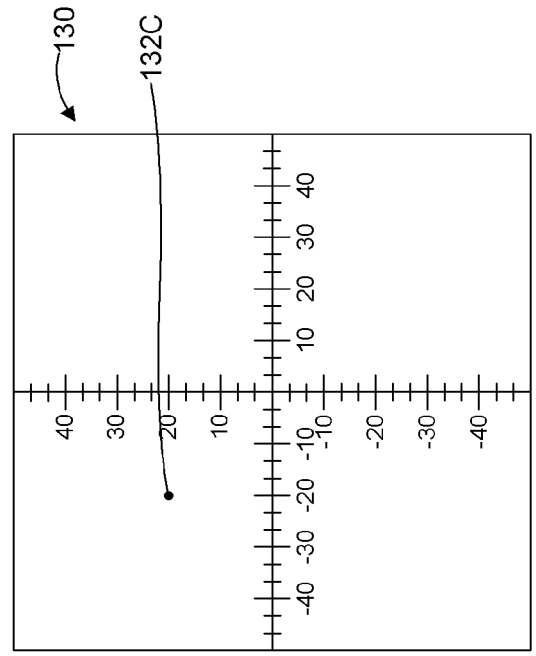
Figure 7D:
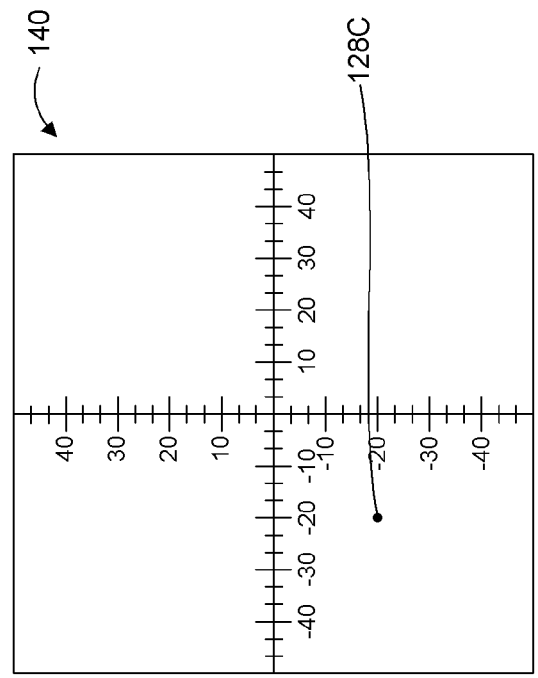

FIG. 6D illustrates a representation of the coordinate system 130 of the optical coding pattern 112. In the illustrated example, the center of the camera view area 126D is indicated by reference numeral 132D in FIG. 6D and has coordinates that are determined to be (−20, −20). The processor uses a software module to translate the coordinates associated with the center of the camera view area 126D to a corresponding location in the reference coordinate system 140 of the upper surface of the object holder 110. The corresponding location indicated by reference numeral 128D has coordinates that are determined to be (−20, 20), as shown in FIG. 7D.

The processor translates coordinates associated with three-dimensional data 134D (FIG. 8D) (e.g. Step S216), which was acquired in the measuring field 118D of FIG. 4D, to the reference coordinate system 140. For example, as shown in FIG. 8D, coordinates indicated by reference number 129D correspond to a center of the three-dimensional data 134D, and are translated to the value of the coordinates indicated by reference numeral 128D shown in FIG. 7D.

In addition, the coordinates associated with three-dimensional data 134D are translated by ninety degrees based on the value of the orientation of the optical markers 124 with respect to the reference orientation indicated by arrow 125 in the coordinate system 130 of the optical coding pattern 112. That is, an orientation of the optical markers 124 having a value of two-hundred-seventy degrees with respect to the reference orientation in the coordinate system 130 of the optical coding pattern 112 corresponds to an orientation of ninety degrees with respect to the reference orientation in the reference coordinate system 140 of the upper surface of the object holder 110. Translating the coordinates associated with three-dimensional data 134D based on the orientation of the optical markers 124 ensures that the three-dimensional data 134D are aligned properly with respect to the three-dimensional data 134A, 134B, and 134C, when a composite three-dimensional representation of the object 102 is formed.

Figure 8E:
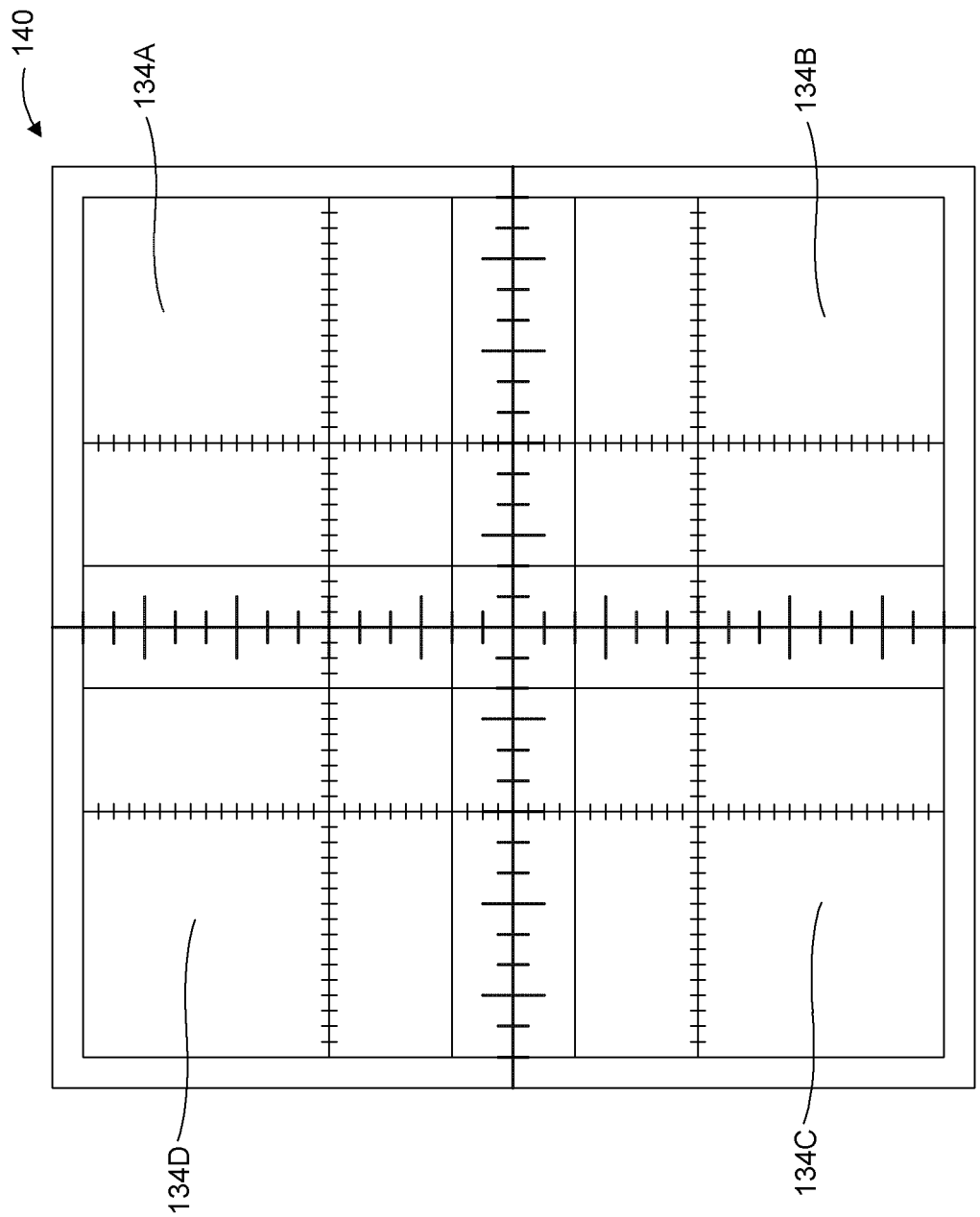
FIG. 8E illustrates composite measurement data resulting from the measurement data illustrated in FIGS. 8A-8D.

The measurement data 134A, 134B, 134C, and 134D respectively include three-dimensional data for portions A, B, C, and D of the object 102. As shown in FIG. 8E, the original coordinates associated with each datum of the measurement data 134A, 134B, 134C, and 134D have been translated to corresponding coordinates in the reference coordinate system 140 of the upper surface of the object holder 110. Accordingly, the coordinates of the measurement data 134A, 134B, 134C, and 134D shown in FIG. 8E are now correlated in the reference coordinate system 140. When the values of the measurement data 134A, 134B, 134C, and 134D and corresponding coordinates in the reference coordinate system 140 are stored in a storage medium, the storage medium contains correlated, composite three-dimensional data for the object 102.

V. Further Example Embodiment

Another example embodiment of the present invention will be described now.

Figure 11:
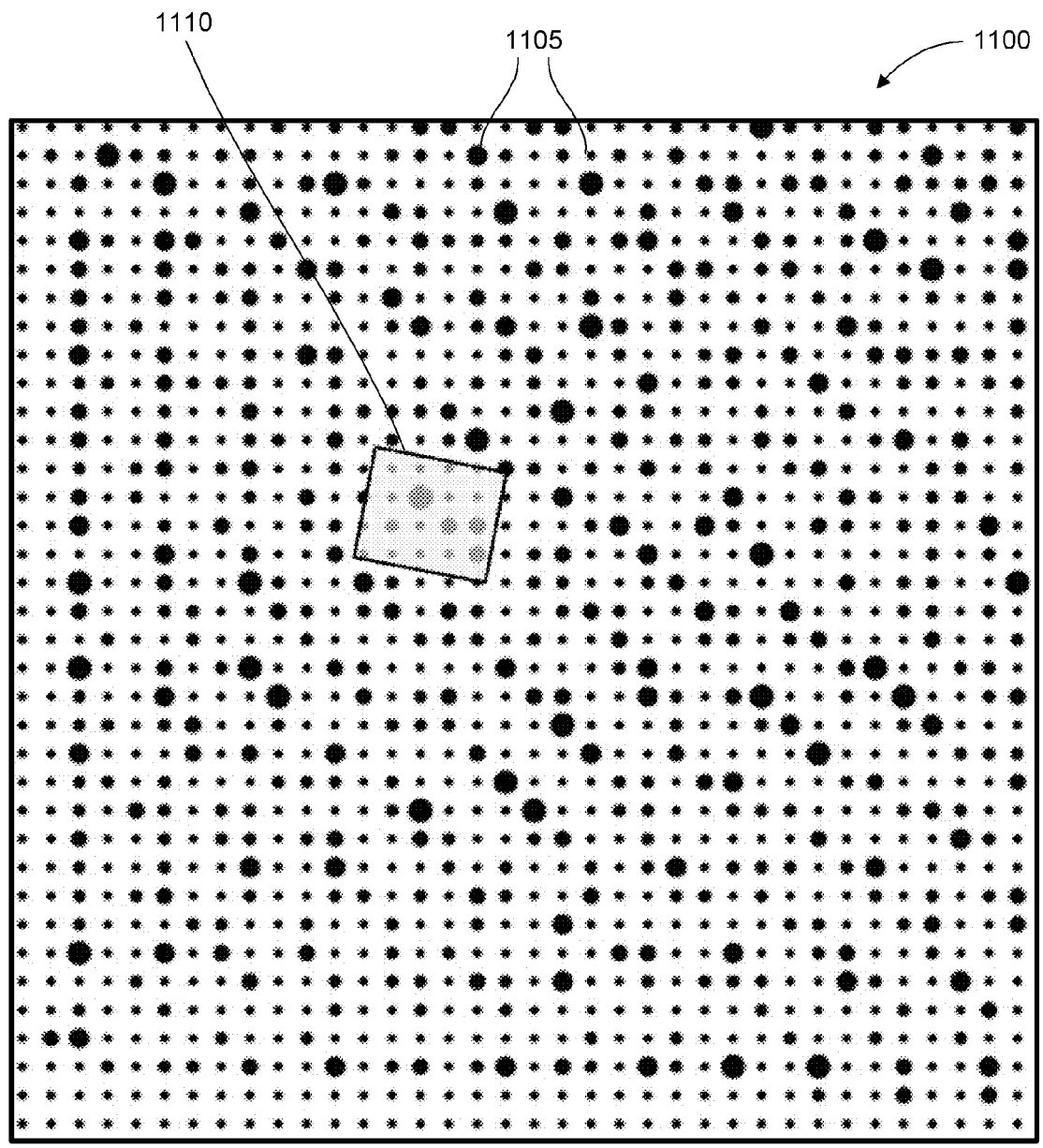
FIG. 11 illustrates an exemplary optical coding pattern according to another embodiment of the present invention.

FIG. 11 illustrates an optical coding pattern 1100 according to this exemplary embodiment of the present invention. The optical coding pattern 1100 is square-shaped and has a height and a width each of 90 mm, although other dimensions can be used. The optical coding pattern 1100 is positionable in the system of FIG. 1A, in place of the optical coding pattern 112 described above. By way of transparent portion 116, the camera unit 114 can view at least a portion of the pattern 1100 to acquire image data representing that portion, which data is processed to determine spatial characteristics of the optical coding pattern 1100, to be described below. Such characteristics can be used as described above to determine corresponding spatial characteristics of the object holder 110 with respect to the measuring unit 104, in a similar manner as described above.

In one example embodiment, spatial characteristics such as coordinates corresponding to a particular location on the portion of the optical coding pattern 1100 can be determined within an accuracy of 5 to 10 microns (which may correspond to $\frac{1}{20}$ to $\frac{1}{10}$ of a camera pixel), and an orientation of the portion of the optical coding pattern 1100 with respect to a reference orientation can be determined within an angular accuracy of 0.04 degrees. Of course, in other embodiments, other shapes, dimensions, etc. can be employed, besides those above.

The optical coding pattern includes optical features having predetermined characteristics (e.g., same or different sizes, shapes, colors, radii, diameters, hollow shapes, solid shapes, distances between optical features, or other types of characteristics that enable the optical features to be identifiable by those characteristics). In the illustrated example, the optical coding pattern 1100 includes, by example only, 1,296 optical features (also referred to as "optical markers") 1105 that are substantially circular in shape, and which can be substantially solid. In other embodiments, however, the optical coding pattern 1100 can include optical features that have hollow or substantially unfilled circular shapes. When unfilled circular shapes are used, a feature value for an unfilled circular shape can be determined based on a radius of an inner portion of the unfilled circular shape and a radius of an outer portion of the unfilled circular shape. Accordingly, when an unfilled circular optical shape is used, a corresponding feature value can be determined using two radii values, which may increase accuracy of determining the corresponding feature value compared to a method that uses a single radius value. In other embodiments, other types of shapes besides or in addition to circular shapes can be used. According to the example embodiment shown in FIG. 11, in which substantially circular optical features are employed, a radius of individual ones of the circular optical features 1105 may have X (e.g., one) of only a predetermined number Y (e.g., five) of discrete values, such that different, predetermined sized optical features 1105 can be employed to uniquely identify a particular position on the optical coding pattern 1100. An optical coding pattern according to a variation of the embodiment illustrated in FIG. 1C described above, on the other hand, may include, for example, optical markers 124 that are circular, each of which has a unique radius that is used to enable identification of a particular position on the optical coding pattern 112. In addition, the optical coding pattern 1100, in the illustrated example of FIG. 11, has no horizontal line segments 120 and vertical line segments 122 forming a grid pattern, as are provided on the optical coding pattern 112 illustrated in FIG. 1C, although in other embodiments such line segments can be employed in optical coding pattern 1100.

According to another example embodiment of the invention, distances between at least two optical features (e.g., between one or more respective adjacent, paired optical features (i.e., inter-optical-feature distances)) may have X (e.g., one) of only a predetermined number Y (e.g., five) of values. In this example embodiment, inter-optical-feature distances (characteristics) can have associated feature values, and can be correlated in a stored table that maps inter-optical-feature distances to corresponding feature values.

According to a further example embodiment of the invention, an optical coding pattern is provided that has a plurality of optical features disposed thereon, wherein individual ones of the plurality of optical features may have X (e.g., one) of only a predetermined number Y (e.g., five) of discrete colors. In this example embodiment, the color values can have associated feature values, and can be correlated in a stored table that associates color values to corresponding feature values, for example. In another example embodiment of the invention, the optical features 1105 of FIG. 11 can have such colors.

Also shown in FIG. 11 is a camera view area 1110 (i.e., an area within view of a camera unit, such as camera unit 114 shown in FIG. 1A, for example). The camera view area 1110 is square-shaped and has a height and a width each of approximately 15 mm, although other shapes and dimensions also can be employed. The dimensions of the camera view area 1110 and the optical features 1105 preferably are pre-selected so that each frame of captured image data corresponding to the camera view area 1110 includes at least a complete N×M (e.g., 3×3 array or other array) array of adjacent optical features 1105. Such an array of adjacent optical features 1105 is used to determine a spatial characteristic of the optical coding pattern 1100, as will be explained in detail below.

Figure 12:
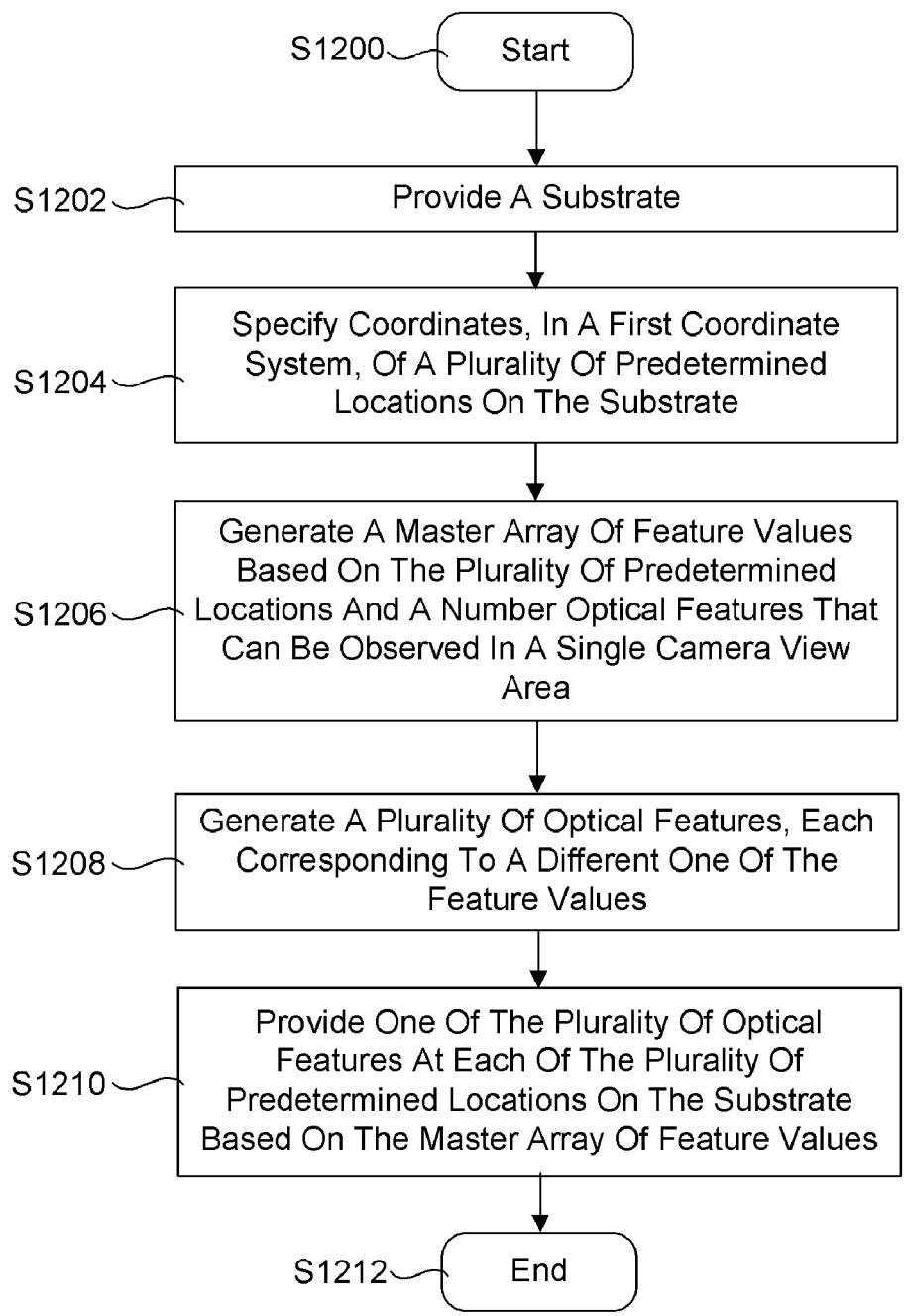
FIG. 12 illustrates an exemplary process of making the optical coding pattern shown in FIG. 11.

Having described an example optical coding pattern 1100, an example of the manner in which such an optical coding pattern can be formed will be described now. FIG. 12 illustrates an exemplary process of making the optical coding pattern 1100 shown in FIG. 11. The process begins in Step S1200. In Step S1202, a substrate is provided. The substrate may be formed from carbon steel, stainless steel, aluminum, brass, or copper, for example. Of course, substrates formed from other materials, such as ceramics or paper, also can be used, depending on applicable design criteria.

In Step S1204, coordinates, in a first coordinate system, are specified for a plurality of predetermined locations on the substrate. For example, this can be done so that coordinates (0,0) are associated with a lower-left corner of a substrate of an optical coding pattern having a square shape with each side being 90 mm in length. In an example case in which there is to be a 36×36 array of optical features distributed uniformly on the optical coding pattern, center portions of the optical features are selected to be spaced apart by about 2.5 mm. Accordingly, coordinates of the plurality of predetermined locations on the substrate range from (1.25, 1.25), (1.25, 3.75), . . . , to (88.75, 88.75), in this example, where each set of coordinates is to correspond to a center of a corresponding optical feature. The coordinates, in the first coordinate system, of the plurality of predetermined locations on the substrate are stored in a memory unit (e.g. secondary memory 910 of FIG. 9).

In Step S1206, a master array of feature values is generated based on the plurality of predetermined locations (and coordinate sets) of Step S1204 and a number of optical features that can be observed in a single camera view area (e.g. camera view area 1110). The feature values are to be associated with corresponding predetermined locations and optical features that are to be disposed at those predetermined locations (as described below), and are provided in the memory unit. For example, in a case where a 36×36 master array of feature values is to be generated, that master array of feature values corresponds to 1,296 feature values, each of which is to be associated with coordinates of one of 1,296 predetermined locations. Also by example, in a case where each frame of image data to be acquired by a camera unit (e.g. camera unit 114 shown in FIG. 1D) includes at least a 3×3 sub-array of optical features, these features are known to the processor 906 (FIG. 9) to correspond to a 3×3 sub-array of feature values (i.e., numbers corresponding to optical features), based on information stored in the memory unit. The corresponding feature values form a 3×3 sub-array of feature values. For example, the master array of feature values is populated initially with a first 3×3 sub-array of e.g. [0 0 0; 0 0 0; 0 0 1], and then a three-element column is added in the master array adjacent to the initial sub-array. As a result, an additional 3×3 sub-array is formed that includes the added three-element column and the second and third columns of the first 3×3 sub-array. This process is repeated until the master array is populated fully with feature values. Each 3×3 sub-array in the master array preferably is unique with respect to others of the master array, and preferably has no rotational symmetry.

In Step S1208, a plurality of optical features is generated, wherein each optical feature corresponds to a respective one of the feature values used to generate the master array of feature values in Step S1206. For example, FIG. 15A shows an example table 1500 that includes five optical features and corresponding feature values, although, of course, the invention is not limited to that specific example only. Information such as that shown in the table 1500 may be stored in the memory unit. As can be seen, in the depicted example, the optical features that are generated are circular in shape, although as described above, other shapes can be employed instead.

In Step S1210, individual ones of the plurality of optical features are provided at respective individual ones of the plurality of predetermined locations on the substrate, based on the corresponding individual feature values in the master array of feature values. That is, the optical features are provided on the substrate such that a center portion of each optical feature corresponds to coordinates of a corresponding one of the predetermined locations determined in Step S1204, based on the feature values included in the master array of feature values generated in Step S1206. For example, FIG. 15C illustrates a portion 1510 of an exemplary optical coding pattern that includes at least some optical features of FIG. 15A, wherein, as stated above, FIG. 15A shows those features in association with corresponding feature values. The optical features are arranged according to their corresponding features values, which are included in a portion 1505 of the master array of feature values shown in FIG. 15B (i.e., so that a center portion of each optical feature is placed at coordinates of a location associated with a corresponding feature value). The process ends in Step S1212.

In some applications it can be useful to provide an optical coding pattern in which reproducibility of the optical features is ensured within a range of 1 to 2 microns, for example. At least some manufacturing methods that can be used to produce such optical coding patterns do not need independent calibration of every optical coding pattern produced. A Computer Numerical Control (CNC) milling machine could be used, for example, to provide the optical features to the substrate in Step S1210.

Another alternative is to use a fine blanking or precision stamping process to "punch" the optical features through a suitable material (e.g. substrate). A paperboard or a blank sheet could be used for the substrate. If blank sheets are used, blank sheets made of steel can be useful owing to favorable thermal expansion properties. In one example, good stability of the blank sheet can be achieved for the blanking process by employing blank sheets having a thickness of about 500 microns. Fine blanking also can be useful because, often, only the fine blanking tools and a few processed plates need to be calibrated.

In some cases, it may occur that diameters of optical features may grow steadily with stamping depth. That is, an optical feature at a bottom face of a blank sheet may have a larger diameter than a counterpart optical feature on a top face of the blank sheet. If these variations in diameter are deemed to potentially impact accuracy of an image recognition process, holes can be filled in a subsequent production process. For example, a hard plaster material can be used as a filling material to fill the holes. Then, surfaces can be polished or cleaned using a sharp edge of a blade. Image contrast can be optimized by choosing an appropriate color of the filling material. Similarly, because the optical coding pattern may be mounted to a lower surface of an object holder (e.g., object holder 110 shown in FIG. 1), the object holder itself and/or the blank sheet can be colored to gain a high contrast between the blank sheet and holes punched therethrough, which correspond to optical features.

Figure 13:
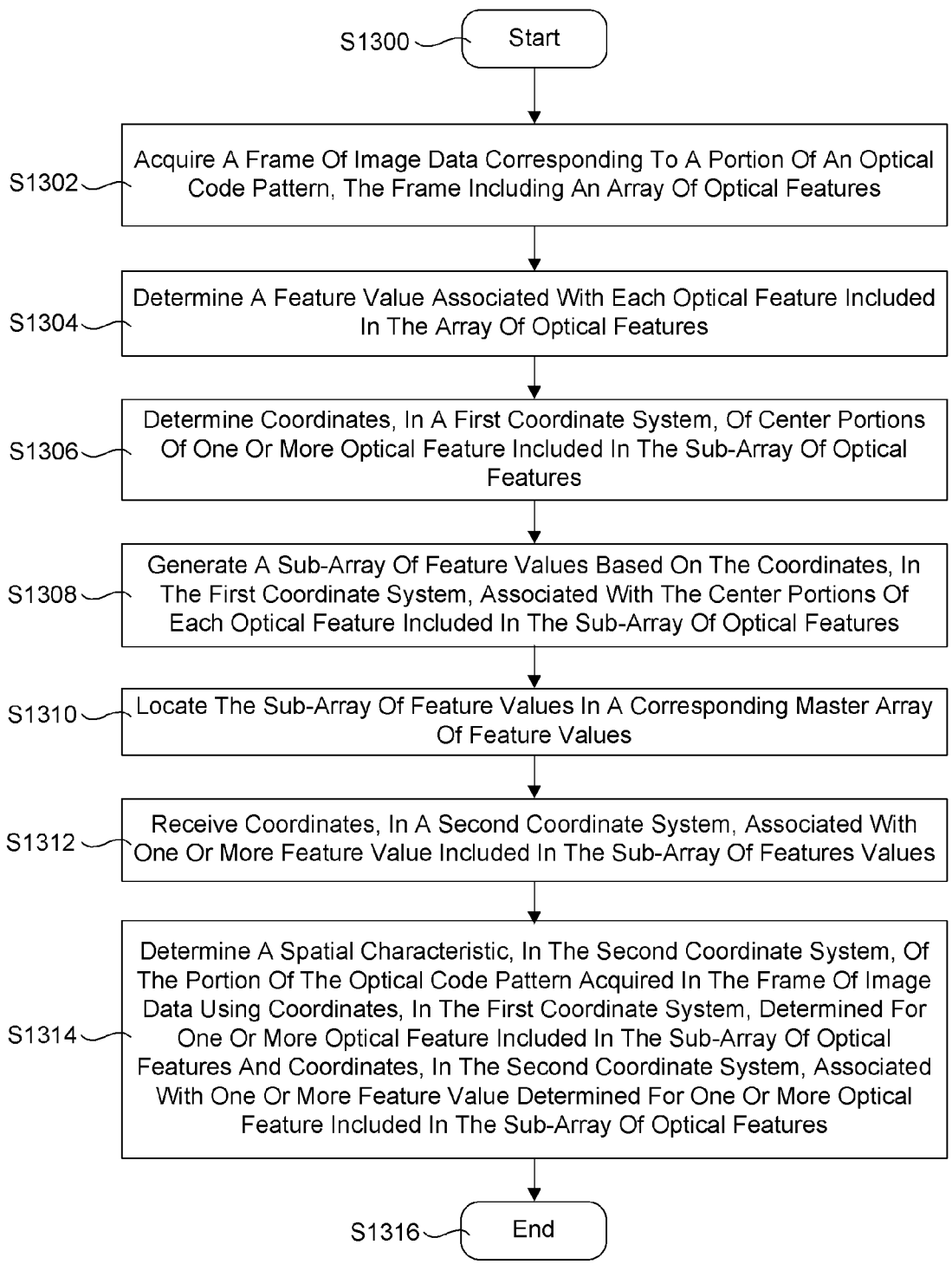
FIG. 13 illustrates an exemplary process of determining a spatial characteristic of an optical coding pattern according to an embodiment of the present invention.

Having described the manner in which an optical coding pattern according to an exemplary embodiment is manufactured, the manner in which a spatial characteristic of the optical coding pattern is determined using a system, such as that of FIG. 1A, now will be described. FIG. 13 illustrates an exemplary process of determining a spatial characteristic corresponding to a portion of an optical coding pattern according to an example embodiment of the present invention. At least a portion of the optical coding pattern is placed within view of a camera unit. For example, the optical coding pattern 1100 is placed on a lower surface of the object holder 110, facing and within view of camera unit 114, in the same manner described above and represented in FIG. 1D (except that optical coding pattern 1100 is used in place of optical coding pattern 112).

The process begins in Step S1300. In Step S1302, a frame of image data corresponding to a portion of the optical coding pattern (e.g. 1100) is acquired by the camera unit (e.g., camera unit 114), in a similar manner as described above in connection with Step S206 of FIG. 2. For example, the camera unit 114 acquires image data of at least a portion of the optical coding pattern 1100 in the camera view area 1110 (shown in FIG. 11) of the camera unit 114 (i.e., the camera unit 114 obtains or captures a digitized scan or image frame of that portion of the optical coding pattern 1100). That is, the camera unit 114 acquires image data corresponding to a portion of the optical coding pattern 1100 that is disposed over and faces the transparent portion 116 of the slide 106.

In the present example, the acquired frame of image data includes a two-dimensional, sub-array of captured optical features 1105. For example, the frame of image data may correspond to an image captured within a camera view area 1520 shown in FIG. 15E. In this example, although 13 optical features total are shown captured within the camera view area 1520, as can be seen in FIG. 15E, nine of those features form a 3×3 sub-array, i.e., a circle in the middle and its 8 nearest neighbors. That is, among the optical features captured in the camera view area 1520 is a 3×3 sub-array that includes 9 optical features that are arranged in 3 rows of 3 optical features each, wherein corresponding optical features in each row form columns of the 3×3 sub-array.

In Step S1304, a feature value is determined for each optical feature of the sub-array of optical features captured within the camera view area 1520, based on the respective characteristics of those features. These determinations can be made, for example, by employing an existing (or later-developed) image processing technique to determine at least one characteristic (e.g. a size, shape, color, radius, diameter, or the like) of each such optical feature. For example, in a case where the characteristic is a radius, the radius can be determined by investigating a border pixel of a feature and fitting a circle into it using any existing or later developed digital image processing technique that employs edge detection, wherein the circle fitting is conducted by employing a solution of a linear set of equations. Each determined radius corresponds to a feature value, as described above, based on information stored in the memory unit. For example, a table (e.g. FIG. 15A) stored in the memory unit can be accessed to obtain a feature value corresponding to a radius determined for each optical feature (or corresponding directly to the optical feature itself). FIG. 15F shows an example 3×3 array 1535 of feature values that corresponds to the 3×3 array of optical features captured within the camera view area 1520 shown in FIG. 15E.

Figures 17A, 17B:
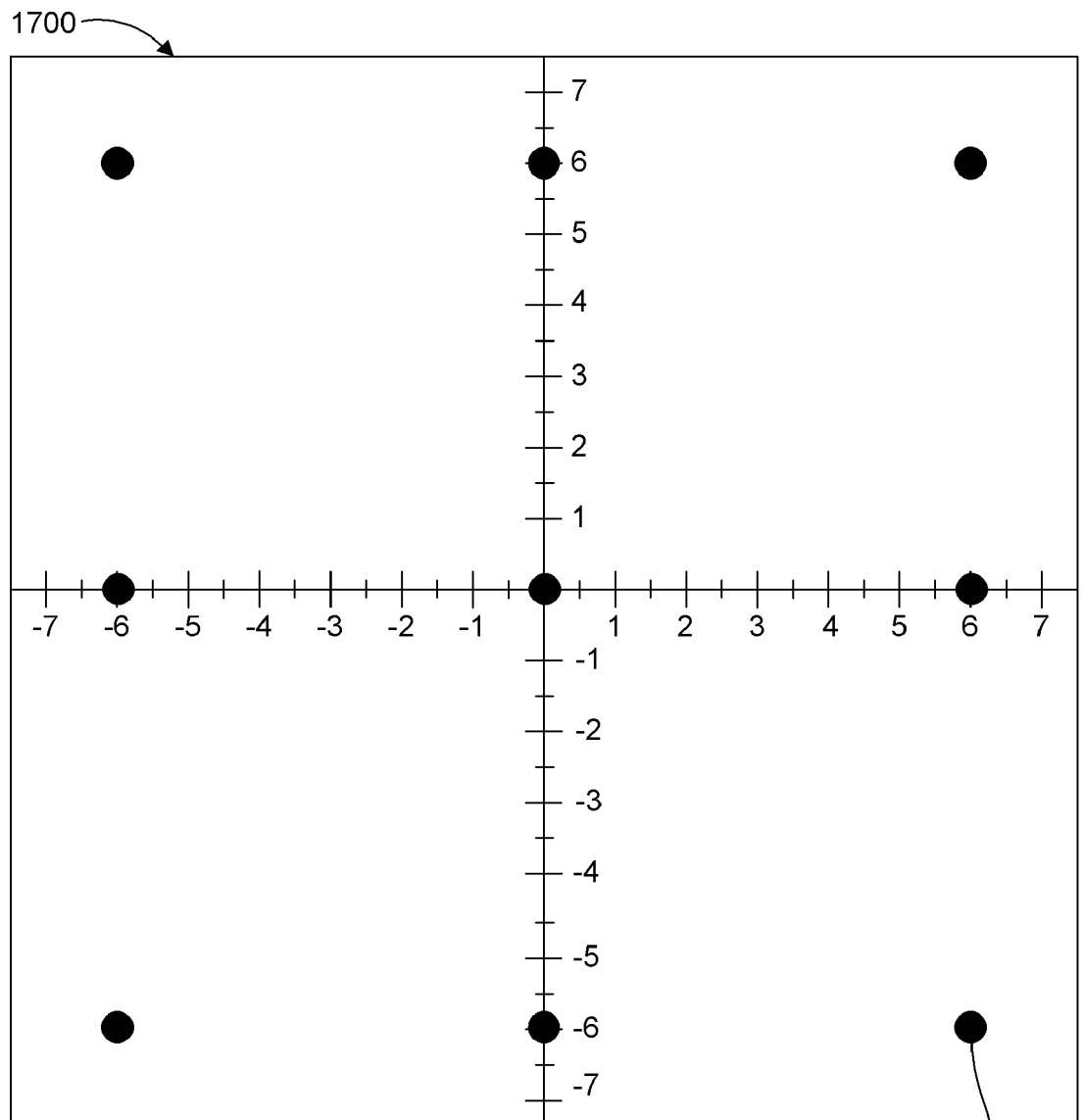
FIG. 17A illustrates a coordinate system of a camera that includes identifiers of locations of centers of features within the camera view area shown in FIG. 15E.
FIG. 17B illustrates coordinates, in the coordinate system of the camera, of the locations of the centers of the features shown in FIG. 17A.

In Step S1306, coordinates, in a first coordinate system, are determined for center portions of the optical features included in the sub-array of optical features. For example, the first coordinate system is a coordinate system used by the camera unit 114 shown in FIG. 1A. FIG. 17A illustrates an exemplary first coordinate system 1700, which has been defined based on the camera view area 1520 shown in FIG. 15D. More particularly, the first coordinate system 1700 has been defined such that a center portion of a center pixel 1525 of the camera view area 1520 shown in FIG. 15D is assigned coordinates (0,0). The coordinates that are determined in Step S1306, are determined within that coordinate system, in this example.

Coordinates of the center portions of the optical features included in the sub-array of optical features may be determined using image processing software that implements a Zhou operator, for example, although in other embodiments, other procedures can be employed. The Zhou operator is discussed in a publication (Zhou, G., "Accurate determination of ellipse centers in digital imagery," ASPRS Annual Convention, Vol. 4, March 1986, pp. 256-264), which is hereby incorporated by reference in its entirety, as if set forth fully herein. FIG. 17B illustrates a table 1710 including exemplary coordinates, in the first coordinate system 1700, that can be calculated in Step S1306, in that coordinate system 1700 of FIG. 17A.

In Step S1308, a sub-array of feature values is generated based on the feature values determined in Step S1304 and the coordinates determined in Step S1306. FIG. 15F illustrates an exemplary 3×3 sub-array 1535 of feature values, which correspond to at least some optical features included within the camera view area 1520 shown in FIG. 15E.

In Step S1310, the sub-array of feature values generated in Step S1308 is located within a corresponding master array of feature values (i.e., the sub-array is matched with a corresponding sub-array in the master array). For example, the 3×3 sub-array 1535 of feature values is located within a master array of feature values 1600, as conceptually illustrated in FIG. 16A.

In Step S1312, coordinates, in a second coordinate system, which have been associated with predetermined locations on the optical coding pattern (see Step S1204) corresponding to the feature values included in the sub-array of feature values generated in Step S1308 and located in Step S1310, are retrieved from the memory unit (i.e., the coordinates corresponding to the feature values matched to in Step S1310 are retrieved). For example, a data structure corresponding to the master array of feature values (see Step S1206) is stored in the memory unit (e.g. secondary memory 910) and includes coordinates, in the second coordinate system, that are associated with each feature value. The memory unit is accessed to retrieve the coordinates associated with one or more of the feature values included in the sub-array of feature values generated in Step S1308. FIG. 16B shows an example table 1605 representing coordinate values retrieved from the memory unit in Step S1312, in one example.

In Step S1314, at least one spatial characteristic (in the second coordinate system) of the portion of the optical code pattern captured in Step S1302 is determined, based on at least one of one or more coordinates (in the first coordinate system) determined in Step S1306, and one or more coordinates (in the second coordinate system) of one or more feature values included in the sub-array of feature values generated in Step S1308. Such spatial characteristics can include, for example, at least one of coordinates and an orientation as determined below in connection with FIG. 14, or other types of spatial characteristics associated with one or more captured portions of the optical coding pattern.

Figure 14:
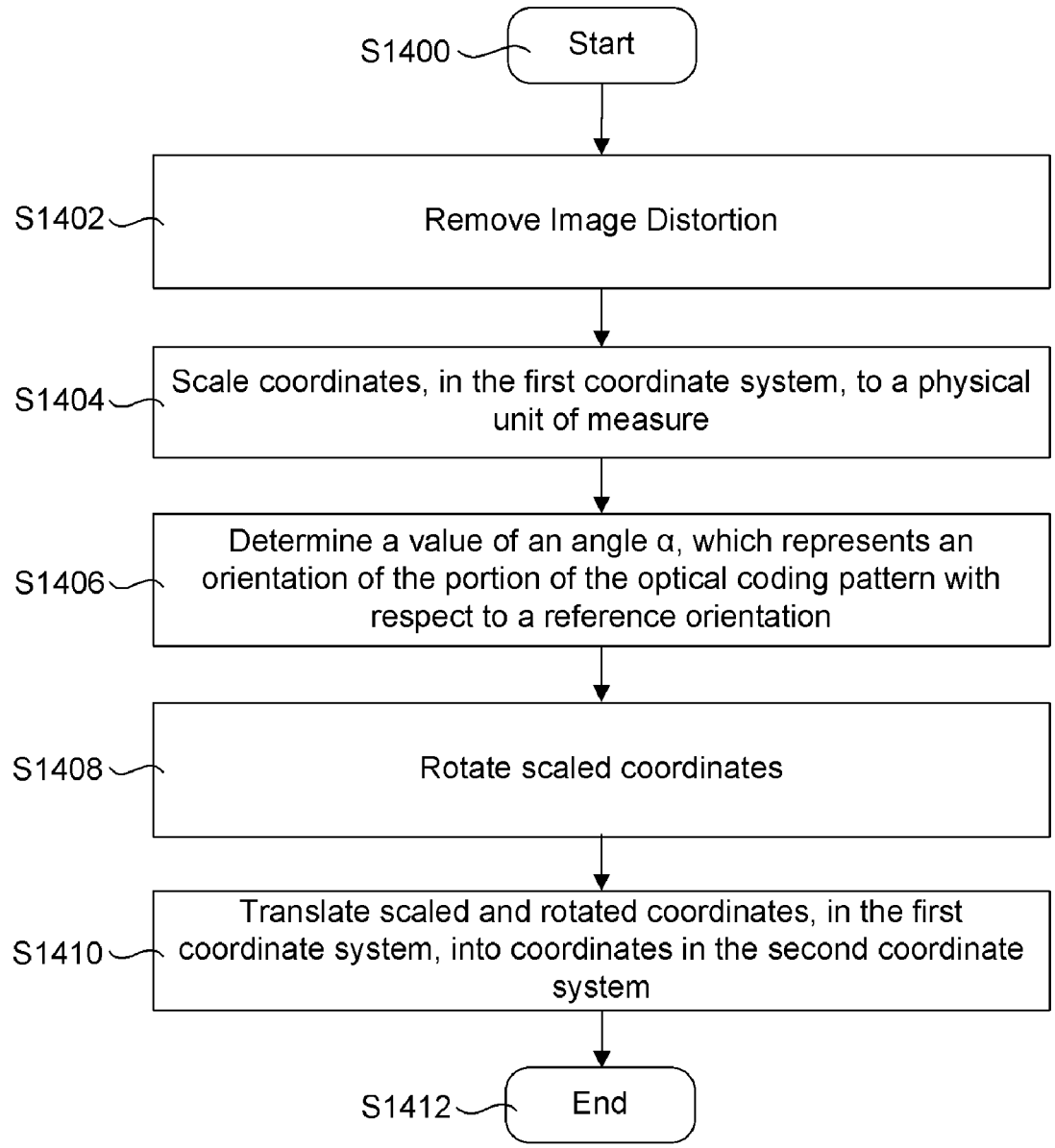
FIG. 14 illustrates a more detailed example of the manner in which Step S1314 of FIG. 13 can be performed according to one example embodiment of the invention.

FIG. 14 illustrates in more detail an example of the manner in which Step S1314 is performed. The process of FIG. 14 begins in Step S1400.

In Step S1402, distortion is removed from the image acquired in Step S1302. For example, to do so image distortion values can be determined prior to acquiring the frame of image data in Step S1302. The image distortion values may be determined by investigating an image of a well-known calibration object, calculating position values of certain features of the calibration object, and comparing the calculated position values of certain features with their corresponding known position values (position values determined using a high-resolution measurement system) to determine image distortion values or deviation values (i.e., amounts by which the calculated position values deviate from the known position values). The resulting deviation values may be stored in a lookup-table and used to correct the acquired image. The image distortion values may be used to remove distortion from the acquired image using existing (or later-developed) image distortion removal techniques. In one example, image distortion can be removed by employing a process such as that discussed in the publication by Amidror, I., entitled "Scattered data interpolation methods for electronic imaging systems: a survey," Journal of Electronic Imaging, Vol. 11(2), April 2002, pp. 157-176, which is hereby incorporated by reference, in its entirety, as if set forth fully herein.

In Step S1404, a magnification value M of the camera unit is used to scale coordinates ($x_c$, $y_c$), in the first coordinate system of the camera unit, which were determined in Step S1306, into scaled coordinates ($x_{sc}$, $y_{sc}$), which correspond to a physical unit of measure, such as microns, using, for example a relationship such as expression (E1) below. For example, the magnification value M can be determined in a calibration step, prior to acquiring the frame of image data in Step S1302, using a calibration process by investigating a well-known calibration target, or by using another suitable technique. For example, in the calibration step, images of a well-known pattern can be obtained and compared to actual dimensions of the well-known pattern, using a known calibration process. As described above, the scaled coordinates ($x_{sc}$, $y_{sc}$) can be determined using the following expression (E1):

$$\begin{pmatrix} x_{sc} \\ y_{sc} \end{pmatrix} = M \cdot \begin{pmatrix} x_c \\ y_c \end{pmatrix} \quad (E1)$$

In Step S1406, a value of an angle $\alpha$ is calculated, wherein the angle $\alpha$ represents an angular offset between a reference orientation of the optical coding pattern 1105 and a reference orientation of the coordinate system of the camera unit 114. In one example embodiment Step S1406 can be performed as follows. Center positions of optical features of a 3×3 sub-array of optical features have been selected to form a rectangular grid pattern (see Step S1204). Information (e.g. coordinates of center portions) defining these center positions is used to electronically fit the rectangular grid pattern onto these center positions. An angle of the grid pattern with respect to the camera sensor is obtained as a fit parameter used for such fitting. A modulo 90° arithmetic operator is applied to the obtained angle to determine the angle $\alpha$. Ambiguity in the angle $\alpha$ may be resolved with a look-up in a corresponding master array of feature values. FIG. 15E illustrates an exemplary angle $\alpha$ formed between a reference orientation of the optical coding pattern indicated by arrow 1515 and a reference orientation of the coordinate system of the camera unit indicated by arrow 1530. In this example, the value of the angle $\alpha$ is determined to be 45 degrees. In other examples, however, the angle $\alpha$ can have any other rotational value.

In Step S1408, the value of the angle $\alpha$ determined in Step S1406 is used to rotate the scaled coordinates ($x_{sc}$, $y_{sc}$), into alignment with the reference orientation of the first coordinate system of the camera unit. Resulting rotated coordinates ($x_{scr}$, $y_{scr}$), in the first coordinate system of the camera unit, can be determined as shown in the example expression (E2) below:

$$\begin{pmatrix} x_{scr} \\ y_{scr} \end{pmatrix} = \begin{pmatrix} \cos(\alpha) & -\sin(\alpha) \\ \sin(\alpha) & \cos(\alpha) \end{pmatrix} \cdot \begin{pmatrix} x_{sc} \\ y_{sc} \end{pmatrix} \quad (E2)$$

In Step S1410, the coordinates ($x_{scr}$, $y_{scr}$), in the first coordinate system of the camera unit, are translated to coordinates (x, y), in a second coordinate system of the optical coding pattern, using an offset value. The offset value may be calculated as a distance between a center optical feature of the 3×3 sub-array and the axis of rotation, which is defined by the origin of the camera view area (e.g. coordinate (0, 0) of the coordinate system 1700 shown in FIG. 17, which corresponds to the center pixel 1525 of the camera view area 1520 shown in FIG. 15).

If an optical feature's position in the optical coding pattern deviates from a nominal position due to a low accuracy of a manufacturing process of optical coding pattern, these deviations can be corrected by means of a correction table. In order to do so, the optical coding pattern may be characterized by a high-resolution measurement system before it is used. Preferably a value of pattern deviation is much smaller than a desired resolution of the complete system. For example, if the measuring unit is able to resolve surface data of an object down to sizes on the order of several microns, the pattern deviation should be much smaller.

In one example embodiment of the manner in which Step S1410 is performed, coordinates (x, y), in the second coordinate system, which correspond to a particular location on the portion of the optical coding pattern acquired in Step 1302, are determined in step S1410 using the following expression (E3), wherein the coordinates ($x_p$, $y_p$) may be obtained in Step S1312, for example.

$$\begin{pmatrix} x \\ y \end{pmatrix} = \begin{pmatrix} x_p \\ y_p \end{pmatrix} + \begin{pmatrix} x_{scr} \\ y_{scr} \end{pmatrix} \quad (E3)$$

Figure 18:
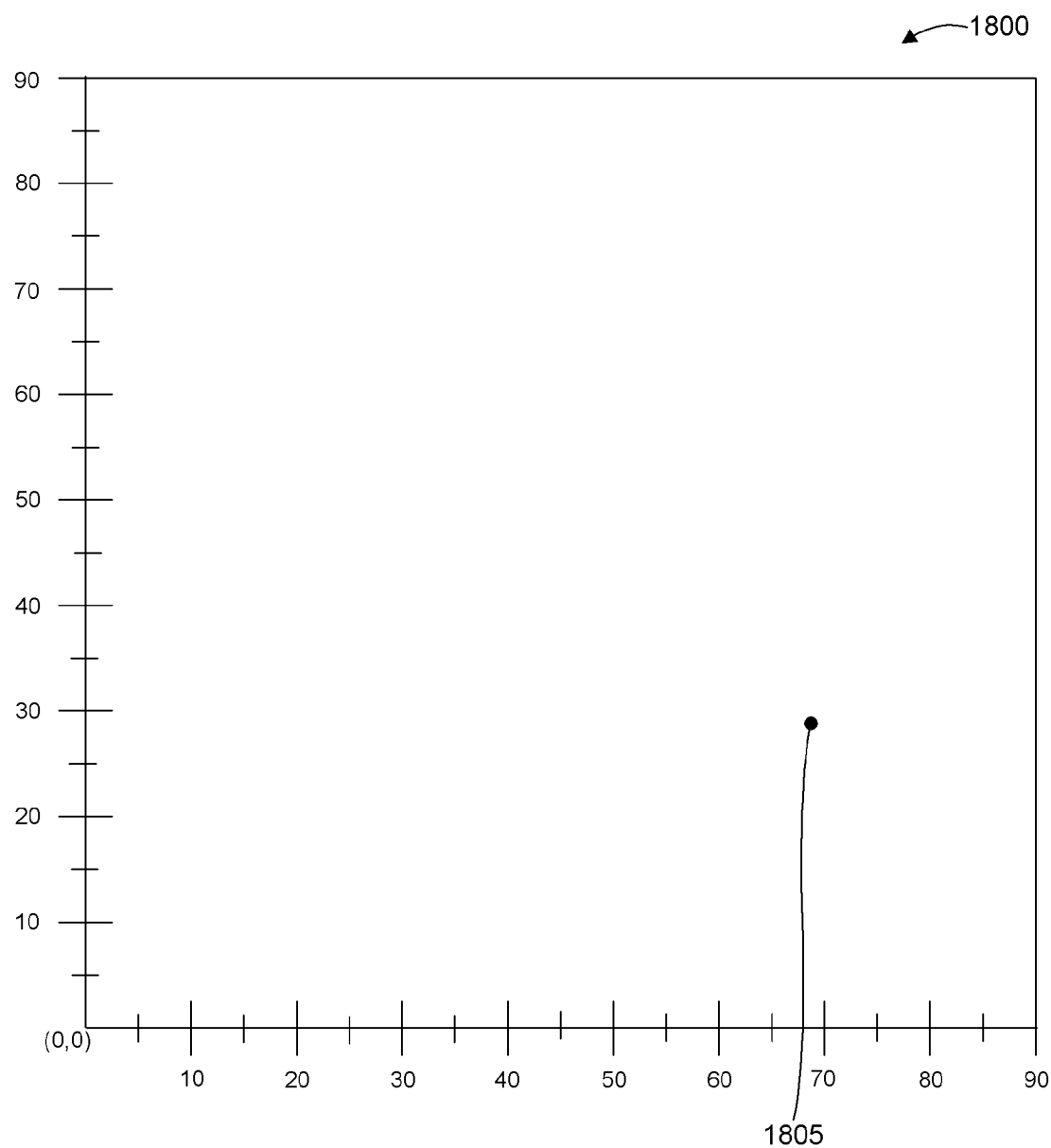
FIG. 18 illustrates a reference coordinate system of an exemplary optical coding pattern that includes identifiers of locations of centers of the features within the camera view area shown in FIG. 15E and an identifier of a location of a center of the camera view area shown in FIG. 15E.

The process ends in Step S1412, which corresponds to Step S1316 shown in FIG. 13. In Step S1412, information representing the value of the angle $\alpha$ and/or the coordinates (x, y) can be stored in the memory unit or transmitted in a message from the system of FIG. 9, for example. FIG. 18 illustrates an exemplary second coordinate system 1800, which has been defined based on the optical coding pattern 1100 shown in FIG. 11. FIG. 18 includes an indicator 1805 corresponding to the center pixel 1525 of the camera view area 1520, as acquired in Step S1302. In this example, the coordinates (x, y), in the second coordinate system, are determined to be (68.75, 28.75).

The optical coding pattern 1100 shown in FIG. 11 can be used to correlate measurement data in a manner similar to that shown in FIG. 2, and that information can be used in conjunction with information obtained in the method of FIG. 13, to obtain a three-dimensional representation of an object, as will now be described.

Figure 19:
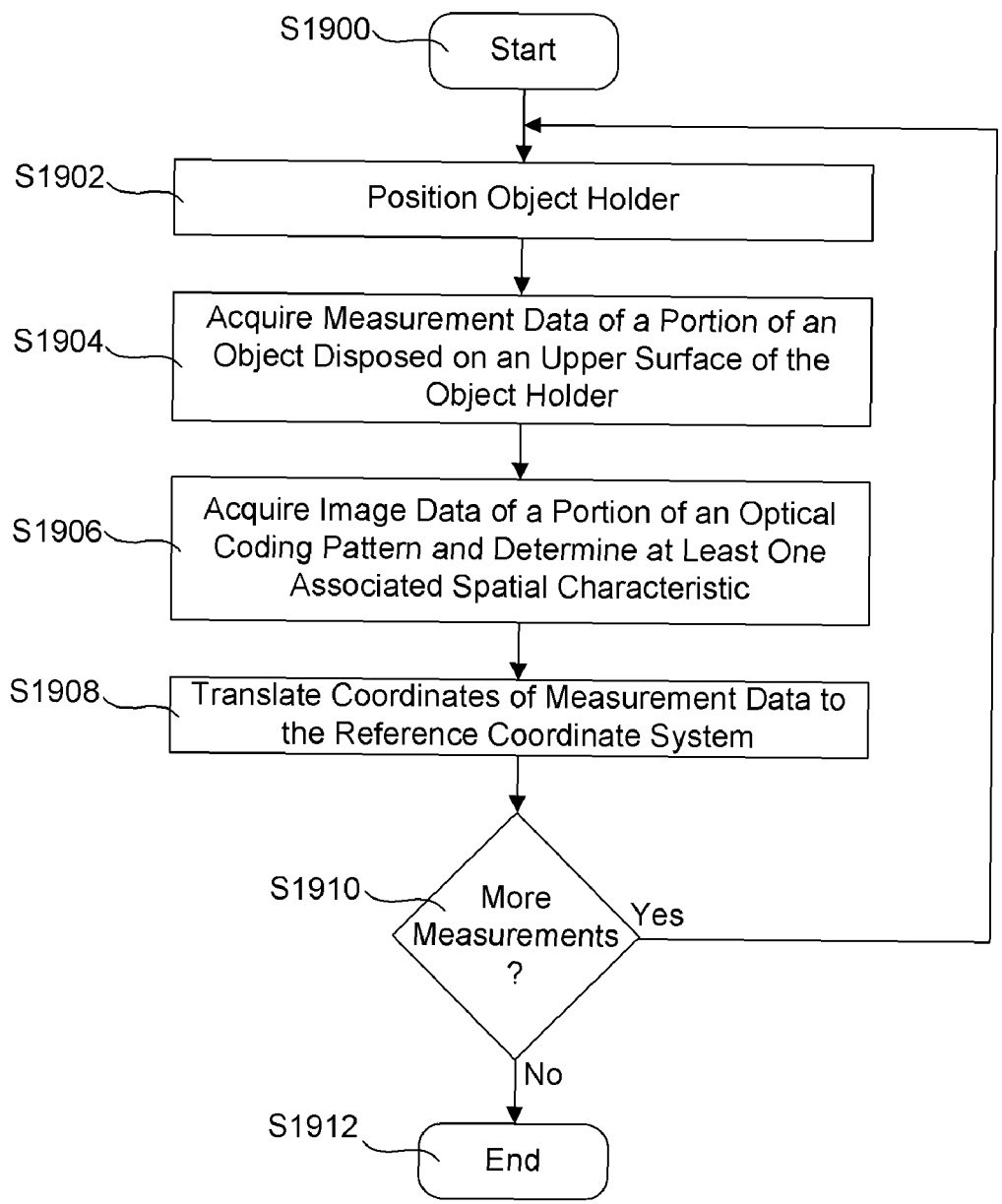
FIG. 19 illustrates an exemplary process for acquiring and correlating three-dimensional data using another optical coding pattern, such as that illustrated in FIG. 11, for example.

FIG. 19 illustrates an exemplary process, according to an aspect of the invention, for obtaining measurement data of an object (e.g. one or more teeth), and spatial characteristics (e.g. spatial coordinates and orientations) associated with, an object holder (e.g. object holder 110 shown in FIG. 1A), for use in obtaining a three-dimensional representation of the object. The process can be performed by an optical position recognition system, such as the systems illustrated in FIGS. 1A and 9, for example, and can incorporate at least some of the procedures shown in FIGS. 12, 13, and 14. Software for performing at least some of those procedures can be stored in a memory unit, such as secondary memory 910 of FIG. 9, and can be executed by a processor, such as processor 906 of FIG. 9.

Referring to FIG. 19 in conjunction with FIGS. 1A, 1D, and 11, the process begins in Step S1900. Initially, the object 102 is placed on or secured to an upper surface of the object holder 110, and the optical coding pattern 1100 is printed on or secured to a lower surface of the object holder 110 (in place of optical coding pattern 112 shown in FIGS. 1A and 1D).

In Step S1902, the object holder 110 is positioned at a selected location on the slide 106. In Step S1904, the measuring unit 104 acquires measurement data in the measuring field 118 in which a portion of the object 102 appears (i.e., the measuring unit 104 captures an image frame of that portion).

In Step S1906, the camera unit 114 acquires image data of at least a portion of the optical coding pattern 1100 in the camera view area 1110 of camera unit 114, and performs procedures to obtain at least one spatial characteristic associated with the captured portion of the optical coding pattern 1100. In one example embodiment of the invention, Step S1906 is performed by performing Steps S1300 through S1316 of FIG. 13 described above.

In Step S1908, a processor (e.g., processor 906 of FIG. 9) of the system 100 uses a software module to perform a translation of coordinates associated with each datum of the measurement data acquired in Step S1904. Those coordinates are in a coordinate system of the measuring unit 104, and may have been determined prior to Step S1908, such as in Step S1904, for example. The translation of Step S1908 can be performed using any suitable translation algorithm, and, in one example embodiment of the invention, can be performed in a manner similar to Step S216 described above.

In Step S1910, a determination is made whether more measurements are to be performed (e.g. whether additional measurements need to be performed to capture other desired parts of the object 102). If more measurements are to be performed ("Yes" at Step S1910), Step S1902 is repeated so that the object holder 110 is moved to another selected location on the slide 106, and Steps S1904 through S1908 are repeated for that location as described above. If no more measurements are to be performed ("No" at Step S1910), the process ends in Step S1912. At this point, all frames of measurement data have translated coordinates that are correlated in the reference coordinate system of the optical coding pattern 1100.

Accordingly, an aggregation of the frames of measurement data can be formed, using obtained spatial characteristics, such as coordinates, to provide composite measurement data for the object 102. As such, Step S1912 can include combining the measurement data obtained in Step S1904 based on the at least one spatial characteristic determined Step S1906, to provide a composite three-dimensional representation of the captured parts of the object 102. This formation of the composite representation may be performed according to any suitable frame registration techniques, such as, e.g. an Iterative Closest Point (ICP) algorithm. However, in principle, no frame registration is needed, as the information from the camera unit 114 is sufficient to create a composite three-dimensional representation of the captured parts of the object 102.

VI. Exemplary System Architecture

The present invention (i.e., system 100, or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

In fact, in one exemplary embodiment, the present invention employs one or more computer systems equipped to carry out the functions described herein. An example of such a computer system 900 is shown in FIG. 9.

Computer system 900 includes at least one processor 904. Processor 904 is connected to a communication infrastructure 906 (e.g., a communications bus, a cross-over bar device, or a network). Although various software embodiments are described herein in terms of this exemplary computer system 900, after reading this description, it will become apparent to a person skilled in the relevant art(s) how to implement the invention using other computer systems and/or architectures.

Computer system 900 includes a display interface (or other output interface) 902 that forwards graphics, text, and other data from communication infrastructure 906 (or from a frame buffer (not shown)) for display on a display unit (or other output unit) 930.

Computer system 900 also includes a main memory 908, which preferably is a random access memory (RAM), and may also include a secondary memory 910. Secondary memory 910 may include, for example, a hard disk drive 912 and/or a removable-storage drive 914 (e.g. a floppy disk drive, a magnetic tape drive, an optical disk drive, and the like). Removable-storage drive 914 reads from and/or writes to a removable storage unit 918 in a well-known manner. Removable storage unit 918 may be, for example, a floppy disk, a magnetic tape, an optical disk, and the like, which is written to and read from by removable-storage drive 914. Removable storage unit 918 can include a computer-usable storage medium having stored therein computer software and/or data.

Computer system 900 also includes a camera unit 932 (e.g. camera unit 114 of FIG. 1A) that captures images and produces image data which is provided to the processor 904, the main memory 908, and/or the secondary memory 910. In addition, the computer system 900 includes a measuring unit 934 (e.g. measuring unit 104 of FIG. 1A) that acquires measurement data that is provided to the processor 904, the main memory 908, and/or the secondary memory 910.

In alternative embodiments, secondary memory 910 may include other similar devices for allowing computer programs or other instructions to be loaded into computer system 900. Such devices may include a removable storage unit 922 and an interface 920 (e.g. a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 922 and interfaces 920 that allow software and data to be transferred from removable storage unit 922 to computer system 900.

Computer system 900 may also include a communications interface 924, which enables software and data to be transferred between computer system 900 and external devices (not shown). Examples of communications interface 924 may include a modem, a network interface (e.g., an Ethernet card), a communications port (e.g., a Universal Serial Bus (USB) port or a FireWire® port), a Personal Computer Memory Card International Association ("PCMCIA") interface, and the like. Software and data transferred via communications interface 924 are in the form of signals, which may be electronic, electromagnetic, optical or another type of signal that is capable of being transmitted and/or received by communications interface 924. Signals are provided to communications interface 924 via a communications path 926 (e.g., a channel). Communications path 926 carries signals and may be implemented using wire or cable, fiber optics, a telephone line, a cellular link, a radio-frequency ("RF") link, or the like.

As used herein, the phrases "computer program medium" and "computer usable medium" may be used to generally refer to removable storage unit 918 used with removable-storage drive 914, a hard disk installed in hard disk drive 912, and signals, for example. These computer program products provide software to computer system 900. The present invention may be implemented or embodied as one or more of such computer program products.

Computer programs (also referred to as computer control logic) are stored in main memory 908 and/or secondary memory 910. The computer programs may also be received via communications interface 924. Such computer programs, when executed, enable computer system 900 to perform the functions of the present invention, as described herein and shown in, for example, FIGS. 2, 12, 13, 14, and 19. In particular, the computer programs, when executed, enable the processor 904 to perform the functions of the present invention. Accordingly, such computer programs represent controllers of computer system 900.

In an embodiment where the present invention is implemented using software, the software may be stored in a computer program product and loaded into computer system 900 using removable-storage drive 914, hard drive 912, or communications interface 924. The control logic (software), when executed by processor 904, causes processor 904 to perform the functions of the present invention described herein.

In another exemplary embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s) in view of this description.

In yet another exemplary embodiment, the present invention is implemented using a combination of both hardware and software.

As will be appreciated by those of skill in the relevant art(s) in view of this description, the present invention may be implemented using a single computer or using a computer system that includes multiple computers each programmed with control logic to perform various of the above-described functions of the present invention.

The various embodiments of the present invention described above have been presented by way of example and not limitation. It will be apparent to persons skilled in the relevant art(s) that various changes in form and detail can be made therein (e.g. different hardware, communications protocols, and the like) without departing from the spirit and scope of the present invention. Thus, the present invention should not be limited by any of the above-described exemplary embodiments, but should be defined only in accordance with the following claims and their equivalents. For example, other embodiments can be ultrasound or other techniques besides optical imaging. It is also to be understood that the steps and processes recited in the claims need not be performed in the order presented. As but one example, Steps S208 and S210 can be performed in reverse order from that described above, so long as the procedures account therefor.

The foregoing description has been described in the context of exemplary embodiments in which a camera unit acquires two-dimensional image data of a lower surface of an object holder, and wherein spatial characteristics are determined based thereon. However, the present disclosure and invention are not limited to that functionality only. Indeed, it is within the scope of the invention to determine the applicable spatial characteristics based on images taken of other parts of the object holder and/or optical coding pattern, such as, for example, one or more sides thereof One skilled in the art will appreciate, in view of the present disclosure, how to adapt the various steps of the method(s) described above, if at all, to obtain spatial characteristics based on the obtained images.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A system for evaluating an optical coding pattern, the system comprising:
   an image acquiring unit arranged to acquire at least one frame of image data corresponding to a captured portion of an optical coding pattern that includes an array of optical features that each have one or another of a variety of appearances, wherein the frame of image data includes a representation of the optical features;
   a processor that stores preset feature values corresponding respectively to the variety of appearances that the optical features can have, and that is operable to correlate the array of optical features with corresponding ones of the feature values, and to determine at least one spatial characteristic associated with the captured portion of the optical coding pattern based on at least one of the feature values and the representation of the array of optical features;
an object holder, wherein the optical coding pattern is disposed in association with a lower surface of the object holder; and
a measuring unit arranged to acquire at least one measurement frame of a captured portion of an object disposed on an upper surface of the object holder,
wherein the processor is further operable to generate composite measurement data based on the at least one measurement frame acquired by the measurement unit and the at least one frame of image data acquired by the image acquiring unit.

2. The system according to claim 1, wherein the at least one spatial characteristic includes at least one of coordinates and an orientation of at least part of the optical coding pattern.

3. The system according to claim 1, wherein the processor also is operable to determine coordinates corresponding to a center portion of each optical feature.

* * * * *